US012732032B2

(12) United States Patent
Prüssmeier

(10) Patent No.: US 12,732,032 B2
(45) Date of Patent: Sep. 8, 2026

(54) ASSEMBLY OF STATOR MODULES FOR A PLANAR DRIVE SYSTEM

(71) Applicant: Beckhoff Automation GmbH, Verl (DE)

(72) Inventor: Uwe Prüssmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 393 days.

(21) Appl. No.: 17/541,530

(22) Filed: Dec. 3, 2021

(65) Prior Publication Data

US 2022/0131426 A1 Apr. 28, 2022

Related U.S. Application Data

(63) Continuation of application No. PCT/EP2020/068000, filed on Jun. 26, 2020.

(30) Foreign Application Priority Data

Jun. 27, 2019 (DE) ..................... 10 2019 117 431.7
Jul. 10, 2019 (DE) ..................... 10 2019 118 635.8

(51) Int. Cl.
*H02K 1/18* (2006.01)
*H02K 11/33* (2016.01)
(Continued)

(52) U.S. Cl.
CPC ............. *H02K 1/182* (2013.01); *H02K 11/33* (2016.01); *H02K 29/10* (2013.01); *H02K 41/031* (2013.01)

(58) Field of Classification Search
CPC ........ H02K 1/182; H02K 11/33; H02K 29/10; H02K 41/031; H02K 2201/18;
(Continued)

(56) References Cited

U.S. PATENT DOCUMENTS 4,126,797 A 11/1978 Kling
4,458,227 A 7/1984 Petersen
(Continued)

FOREIGN PATENT DOCUMENTS

DE 102007038845 A1 3/2009
DE 102017131304 A1 6/2019
(Continued)

OTHER PUBLICATIONS

International Search Report and Written Opinion dated Sep. 11, 2020 in connection with International Patent Application No. PCT/EP2020/068000, 21 pages including English translation.
(Continued)

*Primary Examiner* — Christopher M Koehler
*Assistant Examiner* — Riley Owen Stout
(74) *Attorney, Agent, or Firm* — Dorsey & Whitney LLP

(57) ABSTRACT

An assembly of stator modules for a planar drive system comprises a first stator module and a second stator module, The first stator module and/or the second stator module each comprise stator segments with a segment width, the stator segments being energizable, where the stator segments can provide a magnetic field in order to interact with the magnet arrangements of a rotor for driving and/or holding the rotor of the planar drive system. The first stator module and the second stator module are arranged spaced apart from each other and thereby form a gap, where the gap has a gap width, and where the gap width is smaller than or equal to the segment width.

19 Claims, 23 Drawing Sheets

(51) Int. Cl.
*H02K 29/10* (2006.01)
*H02K 41/03* (2006.01)

(58) Field of Classification Search
CPC ...... H02K 2213/09; H02K 41/02; H02K 1/12; B65G 45/10; B65G 54/02
See application file for complete search history.

(56) References Cited

U.S. PATENT DOCUMENTS

| | | | | |
|---|---|---|---|---|
| 6,097,114 | A | 8/2000 | Hazelton | |
| 6,311,098 | B1 | 10/2001 | Higasayama et al. | |
| 6,353,273 | B1 | 3/2002 | Heshmat et al. | |
| 6,445,093 | B1 | 9/2002 | Binnard | |
| 7,886,956 | B2 | 2/2011 | Seyama et al. | |
| 9,202,719 | B2 | 12/2015 | Lu et al. | |
| 10,116,195 | B2 * | 10/2018 | Lu | H02N 15/00 |
| 11,038,410 | B2 | 6/2021 | Brinkmann et al. | |
| 11,437,902 | B2 | 9/2022 | Brinkmann et al. | |
| 12,040,675 | B2 | 7/2024 | Luthe et al. | |
| 2005/0255624 | A1 | 11/2005 | Miyajima | |
| 2008/0073561 | A1 | 3/2008 | Butler et al. | |
| 2011/0062901 | A1 * | 3/2011 | Busch | H02K 11/215 318/135 |
| 2012/0098391 | A1 | 4/2012 | Yamasaki et al. | |
| 2012/0156898 | A1 | 6/2012 | Kallee | |
| 2012/0307476 | A1 | 12/2012 | Masuzawa et al. | |
| 2012/0328836 | A1 * | 12/2012 | Binnad | G03F 7/70758 355/72 |
| 2013/0278087 | A1 | 10/2013 | Kimiabeigi | |
| 2014/0062236 | A1 | 3/2014 | Taniguchi et al. | |
| 2014/0285122 | A1 | 9/2014 | Lu et al. | |
| 2015/0301458 | A1 * | 10/2015 | Shibazaki | H02K 7/08 355/72 |
| 2015/0369216 | A1 | 12/2015 | Kisovec | |
| 2016/0099623 | A1 | 4/2016 | Böhm et al. | |
| 2016/0194158 | A1 * | 7/2016 | Senn | B65G 43/00 198/794 |
| 2016/0241173 | A1 | 8/2016 | Prüssmeier et al. | |
| 2016/0254722 | A1 | 9/2016 | Yamamoto et al. | |
| 2017/0163140 | A1 | 6/2017 | Lu | |
| 2017/0179806 | A1 | 6/2017 | Lu | |
| 2018/0205304 | A1 | 7/2018 | Lu | |
| 2018/0212505 | A1 | 7/2018 | Ding | |
| 2020/0223645 | A1 * | 7/2020 | Feyrer | B65G 54/02 |
| 2020/0303997 | A1 | 9/2020 | Brinkmann et al. | |
| 2020/0304007 | A1 | 9/2020 | Brinkmann et al. | |
| 2020/0304008 | A1 | 9/2020 | Brinkmann et al. | |
| 2020/0304009 | A1 | 9/2020 | Brinkmann et al. | |
| 2020/0304010 | A1 | 9/2020 | Brinkmann et al. | |
| 2020/0321846 | A1 | 10/2020 | Brinkmann et al. | |
| 2021/0091621 | A1 | 3/2021 | Brinkmann et al. | |
| 2021/0091622 | A1 | 3/2021 | Brinkmann et al. | |
| 2021/0184612 | A1 | 6/2021 | Prüssmeier | |
| 2024/0339911 | A1 | 10/2024 | Beckhoff et al. | |

FOREIGN PATENT DOCUMENTS

| | | | |
|---|---|---|---|
| DE | 102017131314 | A1 | 6/2019 |
| DE | 102017131320 | A1 | 6/2019 |
| DE | 102017131324 | A1 | 6/2019 |
| DE | 102017131326 | A1 | 6/2019 |
| DE | 102018117953 | B3 | 11/2019 |
| DE | 102018117981 | A1 | 1/2020 |
| DE | 102017131321 | B4 | 3/2020 |
| DE | 102018129731 | A1 | 5/2020 |
| DE | 102019117430 | A1 | 12/2020 |
| DE | 102019117431 | A1 | 12/2020 |
| EP | 2779390 | A2 | 9/2014 |
| WO | 2013059934 | A1 | 5/2013 |
| WO | 2018176137 | A1 | 10/2018 |
| WO | 2019129547 | A1 | 7/2019 |
| WO | 2019129561 | A1 | 7/2019 |
| WO | 2019129562 | A1 | 7/2019 |
| WO | 2019129564 | A1 | 7/2019 |
| WO | 2019129566 | A1 | 7/2019 |
| WO | 2019129576 | A1 | 7/2019 |
| WO | 2020020605 | A1 | 1/2020 |
| WO | 2020020607 | A1 | 1/2020 |
| WO | 2020260564 | A1 | 12/2020 |
| WO | 2020260566 | A1 | 12/2020 |

OTHER PUBLICATIONS

Office Action dated Feb. 9, 2023 in connection with Canadian patent application No. 3,143,896, 5 pages.
Office Action dated Aug. 26, 2023 in connection with Chinese Patent Application No. 202080047214.8, 14 pages including English translation.
International Search Report and Written Opinion dated Apr. 11, 2023 in connection with International Patent Application No. PCT/EP2022/087192, 18 pages including English translation.
Examination Report dated Sep. 10, 2025 in connection with German patent application No. 102019117431.7, 10 pages including English translation.

* cited by examiner 2
93
97
98
95
96
93
94
10
22-4
λ
93
93
20
11
93
94
λ
93
X
22-3
31
30
93
14
93
94
10
93
93
93
94
12
93
97
98

ASSEMBLY OF STATOR MODULES FOR A PLANAR DRIVE SYSTEM

CROSS REFERENCE TO RELATED APPLICATIONS

This patent application is a continuation of International Patent Application PCT/EP2020/068000, ASSEMBLY OF STATOR MODULES FOR A PLANAR DRIVE SYSTEM, filed Jun. 26, 2020, which claims the priority of German patent applications DE 10 2019 117 431.7, filed Jun. 27, 2019, and DE 10 2019 118 635.8, filed Jul. 10, 2019, entitled ANORDNUNG VON STATORMODULEN FUR EIN PLANARANTRIEBSSYSTEM, the disclosure content of each which is hereby incorporated by reference, in the entirety and for all purposes.

FIELD

The present invention relates to an assembly of stator modules for a planar drive system and to a planar drive system comprising such an assembly and at least one rotor.

BACKGROUND

Planar drive systems may inter alia be used in automation technology, in particular manufacturing technology, handling technology and process engineering. Planar drive systems can be used to move or position a moving element of a facility or machine in at least two linearly independent directions. Planar drive systems may comprise a permanently energized electromagnetic planar motor with a planar stator and a rotor movable on the stator in at least two directions.

German patent application DE 10 2017 131 304.4 of 27 Dec. 2017, published as DE 10 2017 131 304 A1, discloses a planar drive system in which a rotor can be moved over a plurality of stator modules arranged next to one another. Drive magnetic fields are generated by conductor strips in the stator modules and interact with permanent magnets in the rotor in such a way that the rotor can be held suspended above the stator modules or driven by a traveling magnetic field. The traveling field can be generated across the edges of the stator modules and then pass over to an adjacent stator module. The stator surfaces of the stator modules form a common, uninterrupted surface of movement.

SUMMARY

The present invention provides a stator module assembly in which a more flexible assembly of the stator modules is possible. The present invention further provides a corresponding planar drive system.

According to a first aspect, an assembly of stator modules for a planar drive system comprises a first stator module and a second stator module. The first stator module and the second stator module each comprise stator segments having a segment width, wherein the stator segments are embodied to be energizable. With the stator segments, a magnetic field can be provided for driving and/or holding a rotor of the planar drive system. The first stator module and the second stator module are arranged at a distance from each other. As a result, a gap having a gap width is formed. The gap width is less than or equal to the segment width. The segment width thus corresponds to the maximum gap width. It can be provided that the stator segments each comprise six conductor strips, which are embodied as a three-phase system and which can be used to generate the magnetic field.

This makes it possible to move a rotor from the first stator module across the gap to the second stator module. Furthermore, a minimum gap width can be provided, which is defined by a predetermined value. For example, the minimum gap width can be one millimeter. Alternatively, the minimum gap width may correspond to a width of one of the conductor strips if the stator module comprises conductor strips in the stator segments.

The stator modules can e.g. be embodied as in German patent application DE 10 2017 131 304.4 of 27 Dec. 2017. The stator modules disclosed therein have four stator sectors with three stator segments each.

According to a second aspect, a planar drive system has an assembly of stator modules comprising a first stator module and a second stator module, and at least one rotor. The rotor has a plurality of magnet arrangements effective in a drive direction of the rotor and arranged side by side in the drive direction for driving and/or holding the rotor, each having a magnetization period width. The first stator module and/or the second stator module each have stator segments with a segment width, the stator segments being embodied to be energizable. With the stator segments, a magnetic field can be provided for interacting with the magnet arrangements of the rotor for driving and/or holding the rotor of the planar drive system. The first stator module and the second stator module are spaced apart, thereby forming a gap. The gap has a gap width of at most half the number of magnet arrangements effective in a drive direction of the rotor multiplied by the magnetization period width.

EXAMPLES

In one embodiment of the stator module assembly, the first stator module in particular is movably arranged. The first stator module can be moved in such a way that the gap width can be variably changed. This e.g. allows for opening and closing of the gap. It also makes it possible to move a rotor arranged above the first stator module together with the first stator module, for example from one part of the stator module assembly to another part of the stator module assembly.

In one embodiment of the stator module assembly, at least one functional element is arranged in the area of the gap. The functional element can be used to provide further functionalities that go beyond the movement of rotors. This allows for a more variable design of a planar drive system intended for automation technology. By arranging the functional elements in the area of the gap, it is possible to influence the loads arranged on the rotors not only from above a stator surface but also from below the stator surface, thereby making the planar drive system more variable.

In one embodiment of the stator module assembly, the functional element comprises a movable door, which may also generally and simply be referred to as a door. In this regard, the movable door can be arranged to open and close sections of the planar drive system. When the door is open, rotors can move across the gap. When the door is closed, the movement of the rotor across the gap can be restricted or impossible. This allows parts of the planar drive system to be temporarily separated from the rest of the planar drive system, thus providing increased security for a rotor for individual processing steps. If, for example, a processing station for a load arranged on a rotor is separated from the rest of the planar drive system during processing by the door of the functional element, collisions of the rotor with other rotors can be avoided during processing, since the door can prevent such collisions or at least reduce their number.

In one embodiment of the stator module assembly, the movable door has a closed position and an open position, wherein the movable door is in the closed position arranged partially within the gap between the first stator module and the second stator module. By having the movable door in the closed position partially disposed within the gap, a mechanical securing of the door is achieved. The door can e.g. engage in a counter bearing and thus a movement of the door in the direction of the first stator module or in the direction of the second stator module can be restricted or impossible. In this way, even if another rotor collides with the door while the door is in the closed position, movement of the door in the direction of the first stator module or the second stator module can be prevented, thus protecting an area located behind the door.

This may further improve the separation of a processing station from the rest of the planar drive system. It may further be provided that the assembly of stator modules comprises a third stator module, the third stator module and the first stator module being arranged at a distance from each other, thereby forming a further gap. The processing station can then be protected by a further door arranged in the region of the further gap, wherein during a processing operation both doors are correspondingly arranged in a closed position and the further door is partially arranged in the closed position in the further gap. This can enable a processing station in which a rotor reaches the processing station by moving the gap and leaves it again by moving across the further gap.

In one embodiment of the stator module assembly, a housing can be closed around at least the first stator module by the door, the housing being gas-tight and/or fluid-tight and/or particle-tight. This allows for providing a housing for one of the processing stations already described. As a result, e.g. waste produced during processing, such as chips after a milling operation, can be kept inside of the housing and removed from the housing by suction or another device before the door is opened again. In this way, contamination of the rest of the planar drive system can be reduced or avoided altogether.

In one embodiment of the assembly of stator modules, the housing has a further movable door, the assembly of stator modules comprising a third stator module, the third stator module and the first stator module being spaced apart to form a further gap, the further movable door having a closed position and an open position, the further movable door in the closed position being partially disposed within the further gap between the first stator module and the third stator module.

On the one hand, this may allow for a processing station in which a rotor reaches the processing station by moving across the gap and leaves again by moving across the further gap. On the other hand, the housing with the door and the further door can also serve as a lock for the planar drive system, e.g. in order to introduce rotors into a cleanroom area or to discharge them from the cleanroom area again. Furthermore, the housing with the door and the further door can serve as a vacuum lock if the second stator module or the third stator module is arranged in a vacuum chamber and the housing further comprises an evacuation system for the interior of the housing.

In one embodiment of the assembly of stator modules, the functional element comprises a light source and a light detector. With the light source and the light detector, a detection of a moving rotor and/or a detection of a movement of an object between the light source and the light detector may take place. Thus, on the one hand, the light source and the light detector can serve as a light barrier to detect movements of objects in the area of the gap. This can e.g. be used as part of an intervention safeguard to detect personal injury due to unauthorized intervention in certain areas of the planar drive system and to take appropriate measures such as shutting down the planar drive system or processing stations.

Alternatively, the light source and light detector can also be used to read out optical codes, e.g. barcodes or QR codes on a rotor or on a workpiece arranged on a rotor. This can provide location information about specific rotors or specific workpieces, which can be used to control the planar drive system.

In one embodiment of the assembly of stator modules, the functional element provides a air curtain. A air curtain is a system that separates differently conditioned air masses from each other by a barrier of flowing air, thus preventing their exchange. The barrier consists of a directional air flow that circulates in the manner of an air roll between the discharge opening and the intake opening of the device. Air curtains may also be referred to as air doors. This can e.g. be used to reduce or prevent temperature equalization between different sections of a planar drive system or to separate air masses containing different gases.

In one embodiment of the stator module assembly, the functional element has a cleaning brush, the cleaning brush being of fixed and/or rotatable embodiment. The cleaning brush can be arranged within the gap and serve to clean an underside of a rotor. The cleaning brush can comprise fixed and rotatable sections and be movable within the gap in such a way that the cleaning brush can e.g. be moved perpendicular to a stator surface of the stator modules.

In one embodiment of the stator module assembly, the functional element comprises a nozzle for applying a fluid. The fluid can be a gas or a liquid. For example, the fluid is a cleaning fluid that can be used to clean a rotor underside. Alternatively, the fluid can be compressed air that can be used to clean a rotor of coarse debris. Alternatively, the nozzle can be provided to deliver a fluid to a reservoir disposed on or adjacent to the rotor so that the fluid can be transported to any other location in the planar drive system by the rotor and stator modules.

In one embodiment of the assembly of stator modules, the functional element comprises a disinfection element. In this regard, the disinfection element can comprise a nozzle for spraying a disinfectant. Alternatively, the disinfection element can provide electromagnetic radiation, such as UV light. The disinfection element may thereby act on a lower surface and/or an upper surface of a rotor of a planar drive system.

In one embodiment of the stator module assembly, the functional element comprises a suction device. With the suction device, dirt can be sucked off a stator surface. In addition, it can be provided that at least one rotor has a rake blade by which the dirt can be moved in the direction of the suction device. For this embodiment, a movable assembly of the first stator element is particularly advantageous, since the suction device can then be arranged under the first stator module and the gap can be opened when the suction device is to be put into operation.

In one embodiment of the assembly of stator modules, the functional element comprises a holding element. The holding element can be arranged to fix the rotor in a position during a processing of a workpiece arranged on the rotor. Thereby, on the one hand, a horizontal displacement of the rotor in parallel to a stator surface and/or a vertical displacement of the rotor perpendicular to the stator surface can be reduced or prevented. Furthermore, rotation of the rotor about an axis perpendicular to the stator surface can be prevented by the retaining element.

In one embodiment of the planar drive system, the magnetization period width is equal to the segment width.

In one embodiment of the planar drive system, the rotor has two magnet arrangements effective in the drive direction of the rotor and arranged next to each other in the drive direction. This results in the maximum gap width corresponding to the magnetization period width.

BRIEF DESCRIPTION OF THE DRAWINGS

The invention will be discussed in more detail below by way of examples of embodiments and with reference to the accompanying figures. Here, in a schematic illustration in each case.

DETAILED DESCRIPTION

Figure 1:
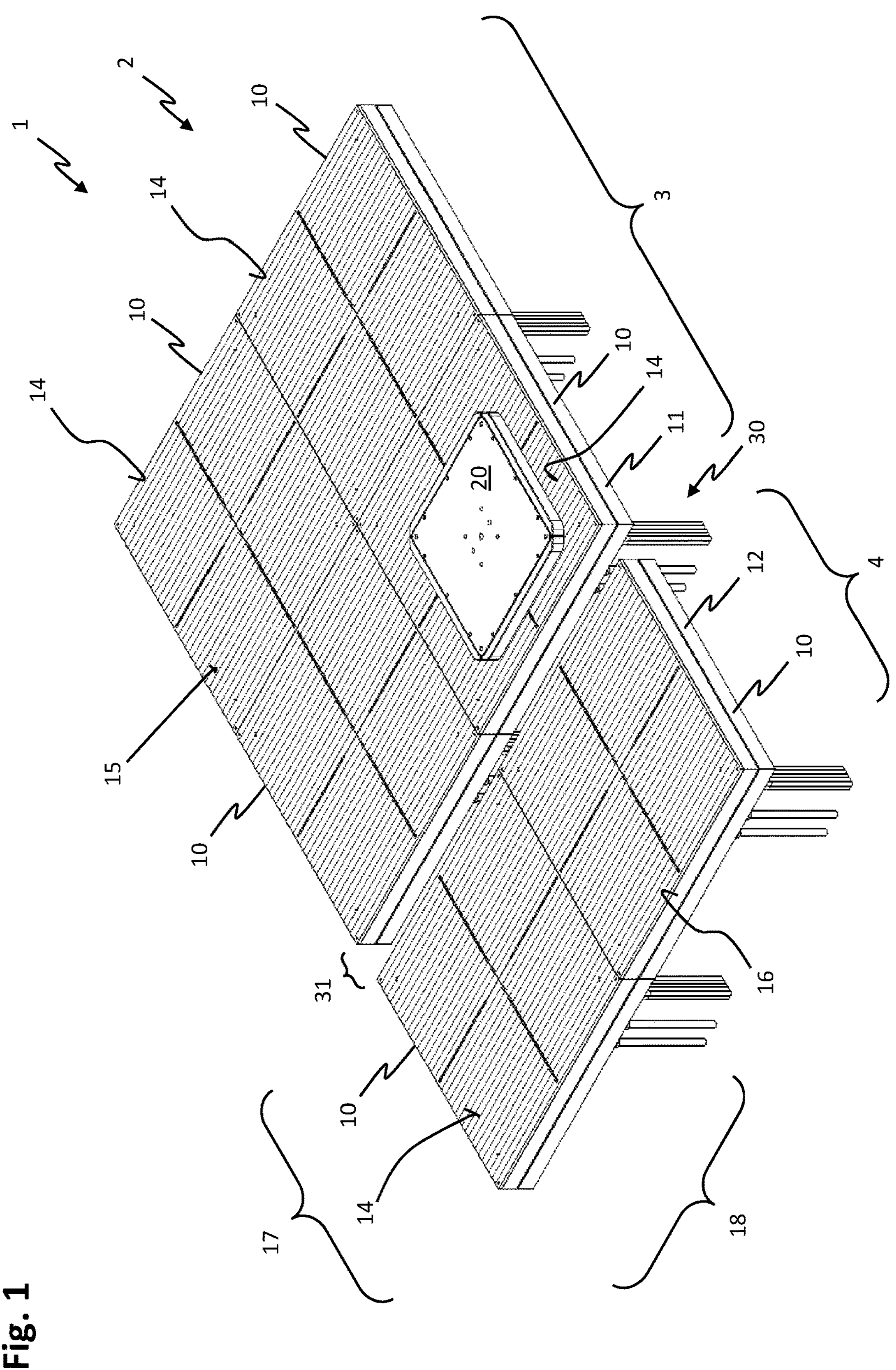
FIG. 1 shows an isometric view of a stator module assembly in a planar drive system.

FIG. 1 shows an isometric view of a planar drive system 1 comprising an assembly 2 of stator modules 10 and a rotor 20. The stator modules 10 can each be embodied as described in German patent application DE 10 2017 131 304.4 of 27 Dec. 2017. In particular, the stator modules 10 can comprise the conductor strips described in said patent application for generating magnetic fields and/or travelling magnetic fields. In this regard, the magnetic fields can be used to maintain the rotor 20 in a vertical position at a distance from the stator modules 10 and to move it in a horizontal direction by way of the traveling field. However, the embodiment of the planar drive system 1 is not limited to a horizontal alignment or extension of the stator modules 10 and a holding of the rotor 20 in a vertical position, or a movement of the rotor 20 in a horizontal direction. Similarly, the stator modules 10 can be aligned or extended in a vertical direction, or any other direction, and the rotor 20 then moves in an analogous alignment approximately parallel to a stator surface 14, or is approximately held at a distance and in parallel to the stator surface 14. Furthermore, it can be provided that the planar drive system 1 comprises more than one rotor 20, but only one rotor 20 is shown in FIG. 1. The planar drive system 1 is divided into a first region 3 and a second region 4. In the first area 3, the planar drive system 1 has four stator modules 10. In the second area 4, the planar drive system 1 has two stator modules 10. A gap 30 is arranged between the first area 3 and the second area 4.

The stator modules 10 each have a stator surface 14. The rotor 20 can be moved above the stator surfaces 14. The stator surfaces 14 each form a continuous surface of movement in the first area 3 and in the second area 4, a first surface of movement 15 in the first area 3, and a second surface of movement 16 in the second area 4. No stator surface 14 is arranged in the region of the gap 30, since the stator modules 10 are arranged at a distance from one another in the region of the gap 30 and, as a result, the stator surfaces 14 of the first surface of movement 15 associated with the stator modules 10 in the first region 3 and the stator surfaces 13 of the second surface of movement 16 associated with the stator modules 10 in the second region 4 are also spaced apart by the gap 30. The first surface of movement 15 is thus separated from the second surface of movement 16 by the gap 30.

The stator modules 10 can be connected to a control unit by communication links. The control unit can be set up to issue control commands to the stator modules. For this purpose, the control unit may have communications that are e.g. configured by a communication interface. The control unit can comprise a computing unit. On the basis of the control commands, selected conductor strips of the stator modules 10 can be energized, and a current strength and/or output power can also be influenced on the basis of the control commands, and a magnetic field strength can thus be set. The control commands can thereby be generated by the computing unit. In particular, the computing unit can thereby have access to a computer program stored in a readable memory, wherein the memory may comprise a hard disk, a CD, a DVD, a USB stick or another storage medium.

The rotor 20 is in this context arranged above a first stator module 11. One of the outer edges of the first stator module 11 abuts on the gap 30. A second stator module 12 is arranged on a side opposite to the gap 30. Thus, the first stator module 11 is associated with the first surface of movement 15, and the second stator module 12 is associated with the second surface of movement 16. The rotor 20 can be moved from the first stator module 11 to the second stator module 12, with the rotor 20 crossing the gap 30 as a result of this movement and thus moving from the first surface of movement 15 to the second surface of movement 16. The stator modules 10 have an identical size and are square. Alternative embodiments of the stator modules (not shown) may also have a rectangular shape or any other shape such as pentagonal, hexagonal, curved or even circular. The stator modules 10 have a first extension 17 and a second extension 18. Due to the square shape, the first extension 17 and the second extension 18 are identical; if the stator modules are rectangular in shape, it may be provided that the second extension is larger than the first extension.

The gap 30 has a gap width 31 that corresponds to a distance between the first stator module 11 and the second stator module 12. It may be provided that the gap width 31 assumes a maximum value. This value of the gap width 31 can be a maximum of twenty percent of the first extension 17.

The maximum value of the gap width 31 of twenty percent of the first extension 17 makes it possible to move the rotor 20 from the first stator module 11 across the gap 30 to the second stator module 12. Furthermore, a minimum value of the gap width 31 can be provided, which is also defined either by reference to the first extension 17 or by a predetermined value. For example, the minimum value of the gap width 31 may be two and a half percent of the first extension 17. Alternatively, the minimum value of the gap width 31 may e.g. be one millimeter.

It may be provided to determine the maximum value of the gap width 31 on the basis of dimensions of components installed in the first stator module 11 or in the second stator module 12. The first stator module 11 and the second stator module 12 can e.g. be embodied as in German patent application DE 10 2017 131 304.4 of 27 Dec. 2017. The stator modules disclosed therein have four stator sectors with three stator segments 93 each.

In one embodiment of the assembly 2 of stator modules 10, the first stator module 11 and the second stator module 12 each have stator segments 93 with a segment width 95, wherein the stator segments are embodied to be energizable. With the stator segments 93, a magnetic field can be provided for driving and/or holding a rotor 20 of the planar drive system 1. The gap width 31 is less than or equal to the segment width 95. Thus, the segment width 95 corresponds at most to the maximum value of the gap width 31. It may be provided that the stator segments 93 each comprise six conductor strips 96, which are configured as a three-phase system and which can be used to generate the magnetic field as described in German patent application DE 10 2017 131 304.4 dated 27 Dec. 2017. The minimum value of the gap width 31 may then correspond to a width of one of the conductor strips. With respect to the stator segments and the conductor strips and the associated dimensions, the contents of German patent application DE 10 2017 131 304.4 of 27 Dec. 2017 are expressly incorporated in this application.

Figure 2:
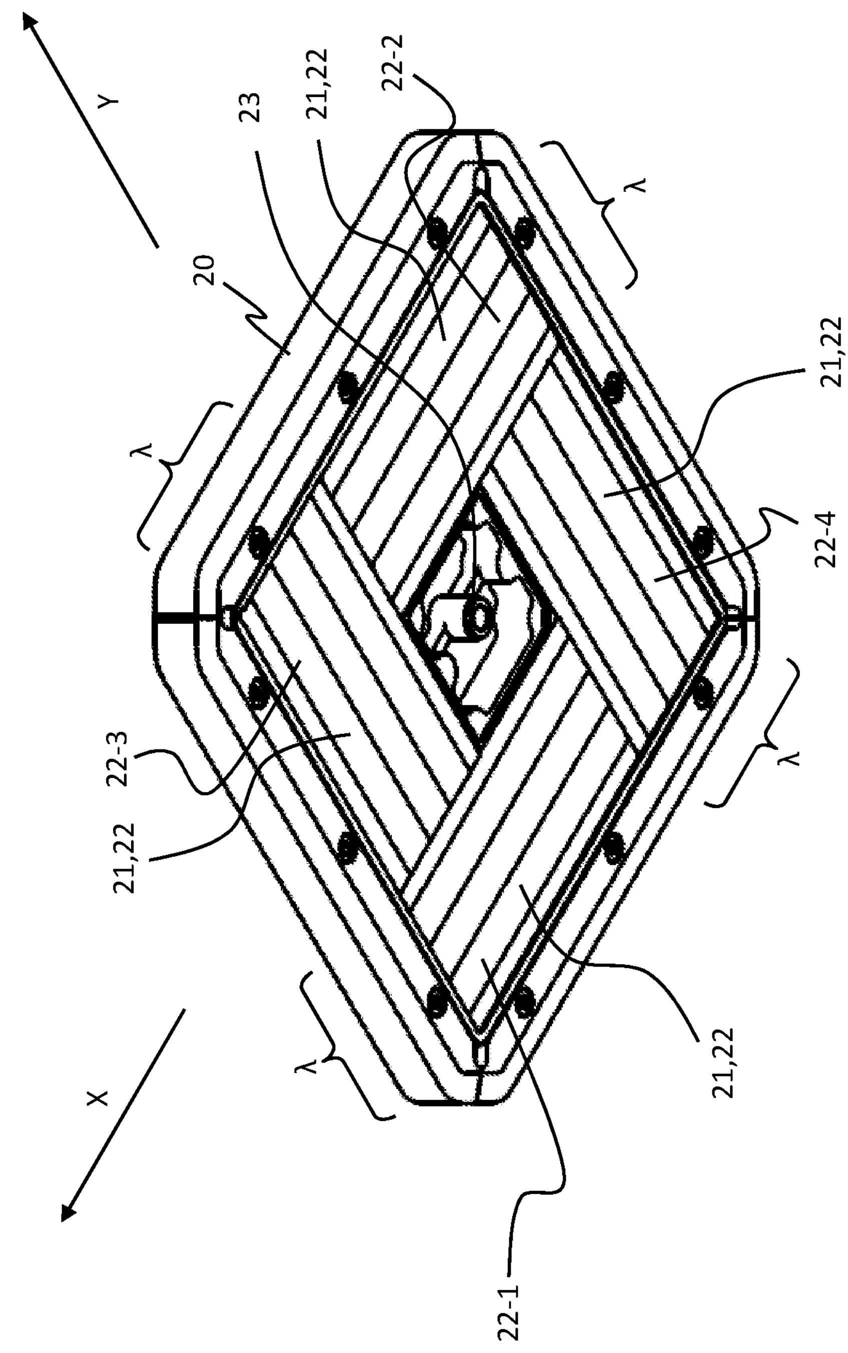
FIG. 2 shows an isometric view of a rotor.

FIG. 2 shows an isometric view of a rotor 20 from below. By way of example, the rotor 20 has four magnet units 21. The four magnet units 21 each have a magnet arrangement 22 consisting of several individual magnets, which are herein provided with an additional identifier for better differentiation. Thus, there is a first magnet arrangement 22-1, a second magnet arrangement 22-2, a third magnet arrangement 22-3 and a third magnet arrangement 22-4. The first magnet arrangement 22-1 and the second magnet arrangement 22-2 are arranged adjacent to each other in the second drive direction Y and are effective for driving the rotor 20 in the second drive direction Y. The third magnet arrangement 22-3 and the fourth magnet arrangement 22-4 are arranged side by side in the first drive direction X and are effective for driving the rotor 20 in the first drive direction X. In this context, arranged side by side means that the third and fourth magnet arrangements 22-3 and 22-4, which are effective in the first direction of movement X, are arranged directly adjacent to each other or spaced apart from each other along the first direction of movement X. In this context, arranged side by side also means that the first and second magnet arrangements 22-1 and 22-2 effective in the second direction of movement Y are arranged directly adjacent to each other or spaced apart from each other along the second direction of movement Y. The first to fourth magnet arrangements 22-1 to 22-4 each have magnetization period width λ. The magnetization period width λ may correspond to the segment width mentioned above. The magnet assemblies 21 are arranged in a ring shape. In the center of the assembly of the magnet units 21, a receptacle 23 is arranged by which the rotor 20 can be mechanically influenced. With regard to the rotor 20 and the magnet units 21 and the associated dimensions, the contents of German patent application DE 10 2017 131 304.4 dated 27 Dec. 2017 are also expressly incorporated in this application.

Figure 3:
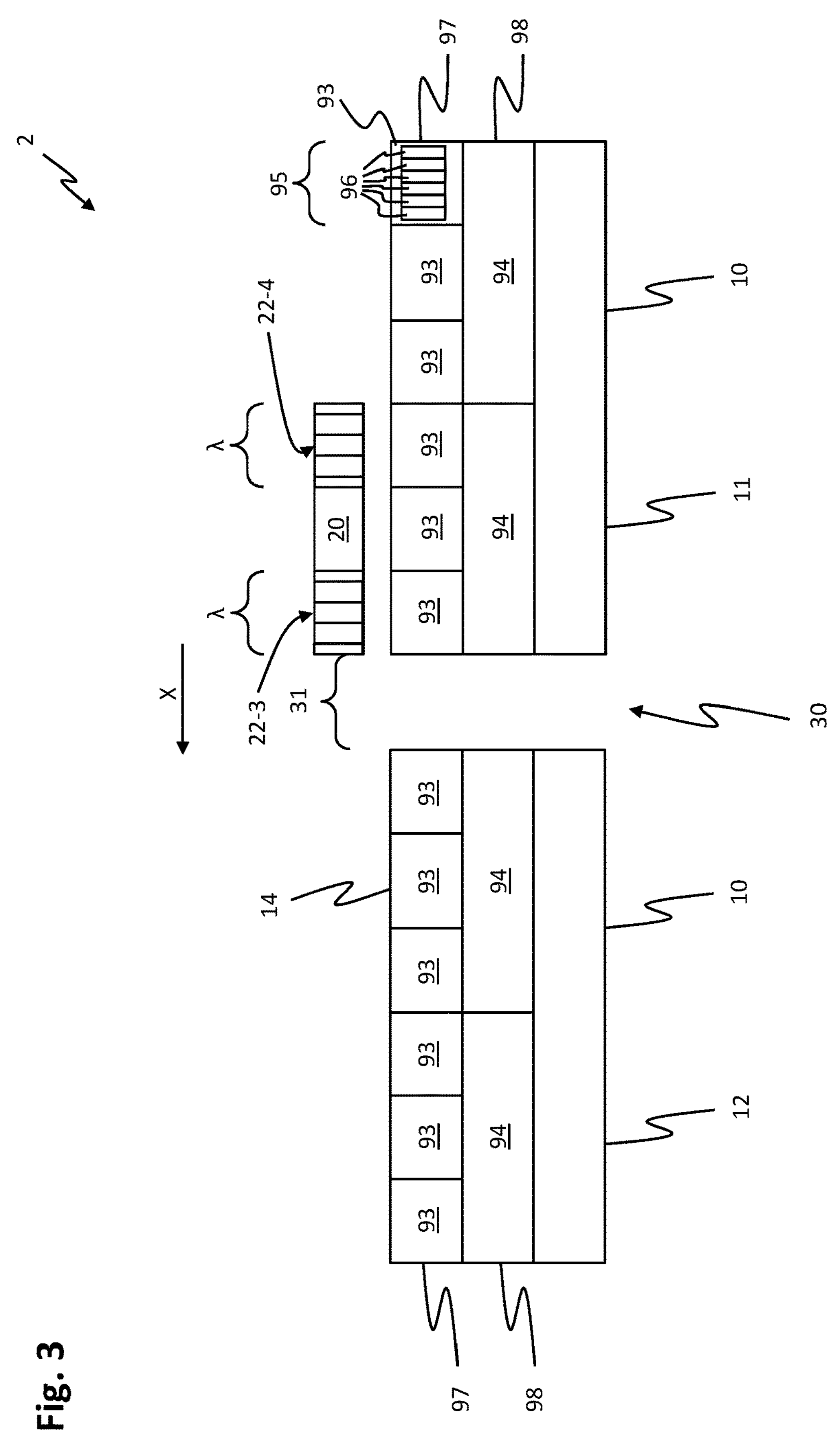
FIG. 3 shows a cross-section of two stator modules and of a rotor.

FIG. 3 shows a schematic cross-section through an assembly 2 of a first stator module 11, a second stator module 12 and a rotor 20. The first stator module 11 and the second stator module 12 comprise a first stator layer 97 and a second stator layer 98, which are arranged on top of each other at right angles as described in German patent application DE 10 2017 131 304.4 dated 27 Dec. 2017. In the first stator layer 97, stator segments 93 are arranged, each having a segment width 95, wherein the segment width 95 may correspond to a magnetization period width λ of a magnet arrangement 22 of the rotor 20. Further stator segments 94 are arranged in the second stator layer 98. Within a stator module 10, six stator segments 93 and six further stator segments 94 perpendicular thereto are arranged in each case, the further stator segments 94 forming the second stator layer 98. Due to the cross-sectional view of FIG. 3, only two of the further stator segments 94 are visible. In each case, three stator segments 93 and three further stator segments 94 arranged perpendicular to the stator segments 93 form a stator sector, the stator module comprising four stator sectors. The stator segments 93 and further stator segments 94 visible in FIG. 3 belong to a total of two stator sectors. In total, therefore, the stator modules 10 each have twelve stator segments 93 and twelve further stator segments 94. Within each of the stator segments 93 and the further stator segments 94, respectively, a three-phase system with six conductor strips can be arranged as described in German patent application DE 10 2017 131 304.4 dated 27 Dec. 2017, and serve to generate a magnetic field. In one of the stator segments 93 of the first stator module 11, six current-carrying conductor strips 96 are shown as an example, and the other stator segments 93 and the further stator segments 94 of the first stator module 11 and the second stator module 12, respectively, can also be configured accordingly. In the embodiment shown, the conductor strips 96 of the first stator layer 97 are formed with their longitudinal extension transverse to the first drive direction X. The third magnet arrangement 22-3 and the fourth magnet arrangement 22-4 of the rotor 20 are, in their longitudinal extent, arranged transversely with regard to the first drive direction X, as well. Thus, when the conductor strips 96 of the first stator layer 97 are energized accordingly, the third magnet arrangement 22-3 and the fourth magnet arrangement 22-4 of the rotor 20 can interact via the magnetic field generated by energizing and can be used effectively to drive the rotor 20 in the first direction of movement X.

The gap 30 has a gap width 31. A maximum gap width 31 may correspond to the segment width 95. Alternatively, the maximum gap width 31 may be referred to dimensions of the rotor. As in the shown example of FIGS. 2 and 3, two magnet arrangements 22, the third and the fourth magnet arrangements 22-3 and 22-4, can be effectively used for driving the rotor 20 in the first drive direction X, the maximum gap width in this case is equal to half of two multiplied by the magnetization period width λ. Thus, the maximum gap width 31 in the embodiment example shown here is:

$$\text{Max. gap width} = (2/2) * \lambda = \lambda \quad [1]$$

However, smaller gap widths 31 are possible, as well. A minimum gap width can be one millimeter or may correspond to a minimum predetermined fraction of the magnetization period width λ, e.g. ten percent of the magnetization period width λ. Further, the minimum gap width may correspond to the width of one of the conductor strips 96. Further, it may be provided to configure the planar drive system in such a way that the magnetization period width λ and the segment width 95 coincide. In this case, it may be provided that the rotor 20 comprises two magnet arrangements 22 effective to drive in the drive direction X, as shown in FIG. 3. Then, the maximum gap width 31 corresponds to both the magnetization period width λ and the segment width 95.

In an alternative embodiment (not shown), the rotor 20 may also comprise more than two magnet arrangements 22 effective to drive in the drive direction X, e.g. four or six magnet arrangements 22.

Figure 4:
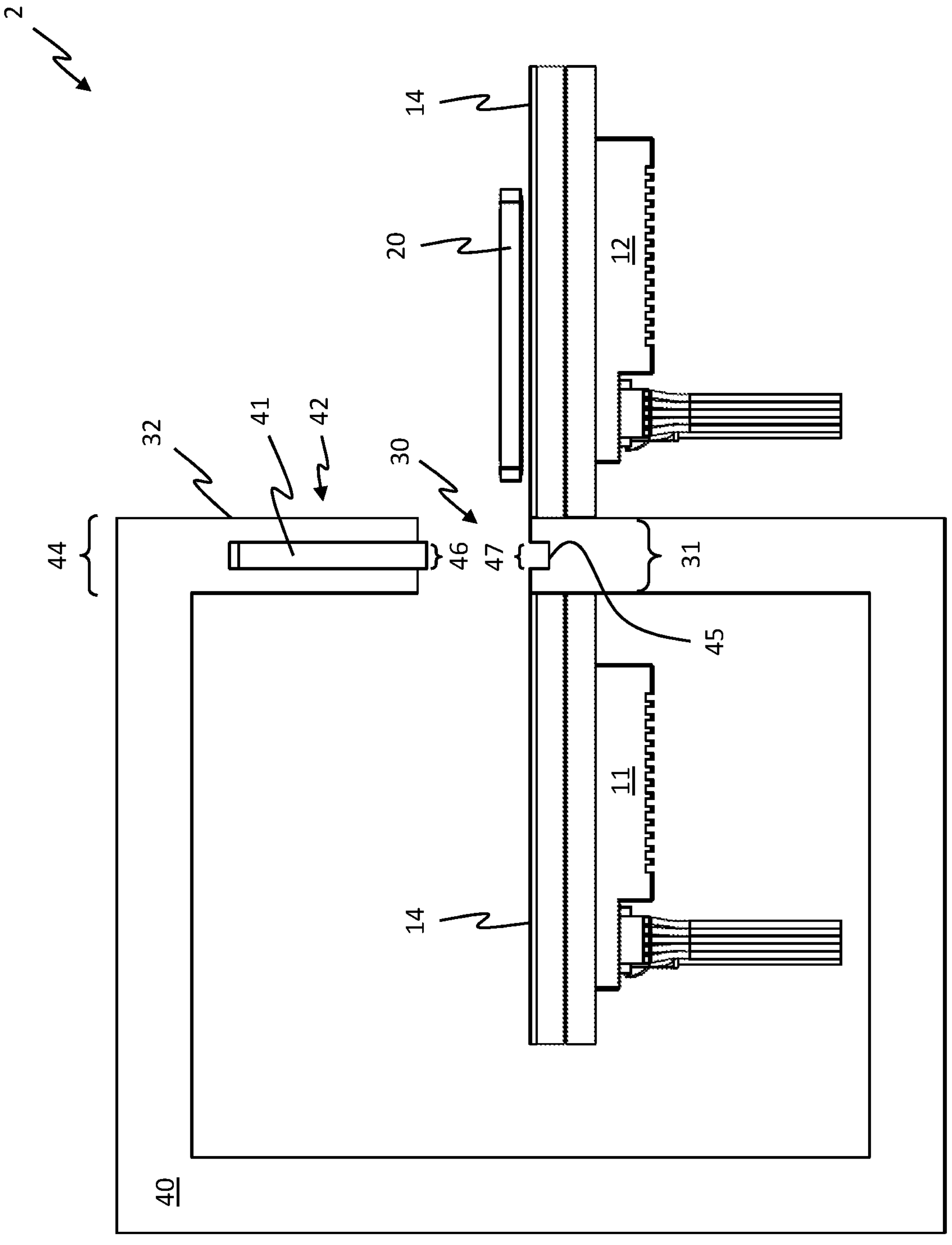
FIG. 4 shows a cross-section of a stator module assembly with a housing and an open door.

FIG. 4 shows a schematic cross-section of an assembly 2 of a first stator module 11 and a second stator module 12. A gap 30 with a gap width 31 is formed between the first stator module 11 and the second stator module 12. A rotor 20 is located above the second stator module 12. The first stator module 11 and the second stator module 12 can correspond to the stator modules described in FIG. 1, and the gap width 31 may also be embodied as described for FIG. 1.

A functional element 32 is arranged in the area of the gap 30. The functional element 32 comprises a movable door 41 and a housing 40. The movable door 41 is in an open position 42, so that the rotor 20 can be moved under the movable door 41 from the second stator module 12 to the first stator module 11 across the gap 30 and is not affected by the movable door 41. In this embodiment example, the movable door 41 is arranged completely above the stator surfaces 14 of the first stator module 11 and the second stator module 12, respectively, in the open position 42.

A housing wall thickness 44 corresponds to the gap width 31. Alternatively, it may also be provided that the housing wall thickness 44 is smaller or larger than the gap width 31. In the area of the gap 30, the housing 40 has a recess 45. The movable door 41 can be moved in the direction of the recess 45. The recess 45 is thereby dimensioned such that a door thickness 46 is smaller than or equal to a recess width 47 and the movable door 41 can thereby be arranged partially within the recess 45.

Figure 5:
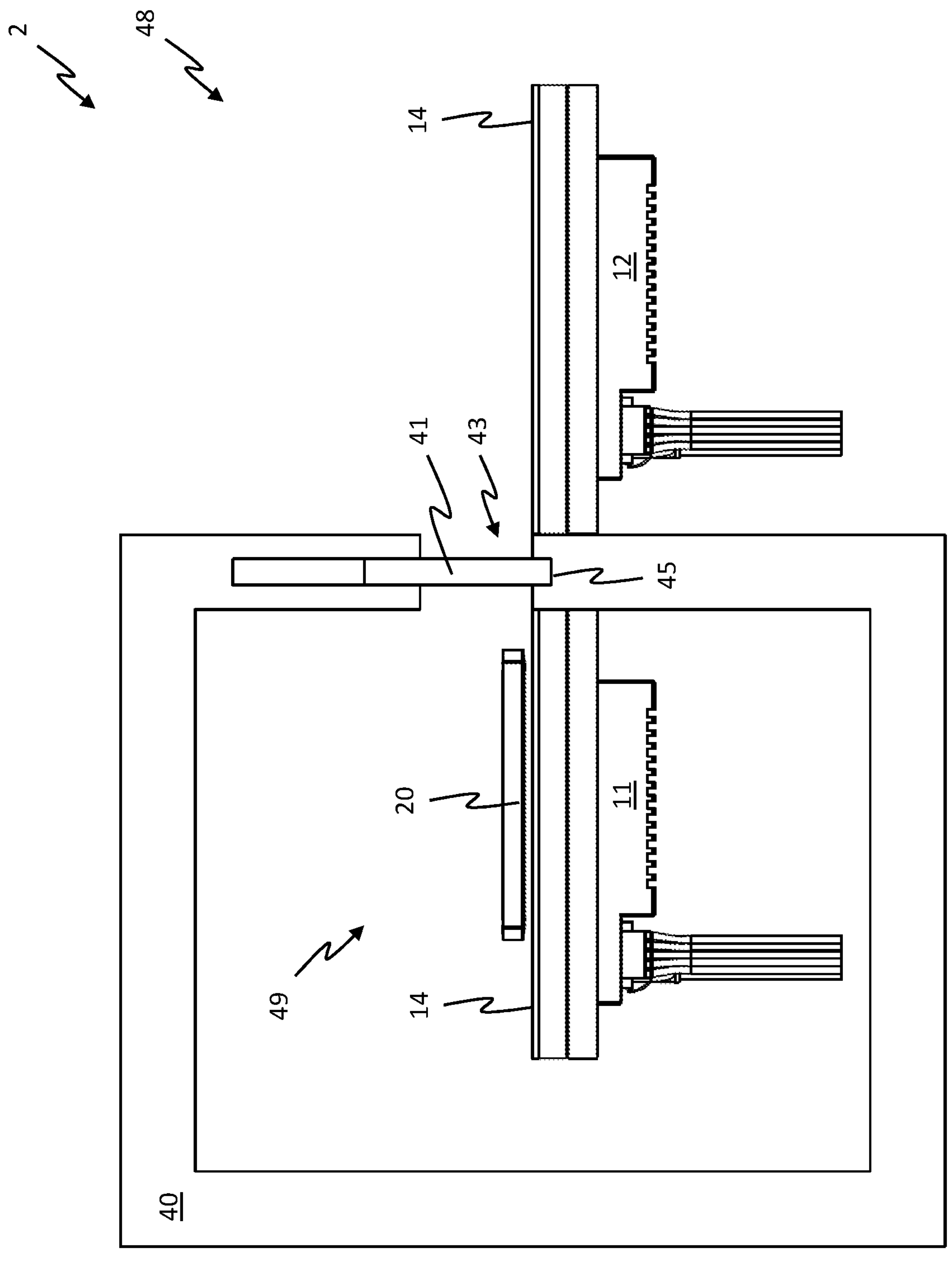
FIG. 5 shows a cross-section of a stator module assembly with a housing and a closed door.

FIG. 5 shows a cross-section of the assembly 2 of FIG. 4 after the rotor 20 has been moved into the housing 40 and thus to the first stator module 11. Furthermore, the movable door 41 is arranged in a closed position 43 and closes the housing 40. Thereby, it may be provided that the housing 40 is fluid-tight and/or gas-tight and/or particle-tight when the movable door 41 is arranged in the closed position 43, i.e. the movable door 41 is closed. The rotor 20 is thus separated from a housing exterior 48 by the movable door 41 and the housing 40, and is arranged in a housing interior 49. The movable door 41 is thereby partially arranged in the recess 45. As a result, a movement of the movable door 41 in the direction of the first stator module 11 or the second stator module 12, respectively, can be reduced or completely prevented in the closed position 43. Now, if a further rotor were to be moved towards the movable door 41 from the second stator module 12, the movable door 41 would not move in the direction of the first stator module 11 even in the event of an unintended collision of the further rotor with the movable door 41. Likewise, even in the event of an unintended collision of the rotor 20 with the movable door 41, an unintended movement of the rotor 20 toward the movable door 41 would not result in a movement of the movable door 41 toward the second stator module 12. In this embodiment example, the movable door 41 is arranged in the closed position 43 partially above and partially below the stator surfaces 14 of the first stator module 11 and of the second stator module 12, respectively.

A processing station not shown in FIG. 5 can be arranged in the housing interior 49. The processing station can be set up to process a workpiece arranged on the rotor 20, which is not shown. If the processing station is e.g. set up to machine the workpiece, then the closed housing 40 can be used to ensure that chips generated during processing remain inside the housing interior 49 and do not reach the housing exterior 48. For this purpose, the housing 40 may additionally have a corresponding suction device.

Likewise, a device for applying a fluid to a workpiece on the rotor 20 can be arranged in the housing interior 49. If the housing 40 is embodied to be fluid-tight, it may be achieved that the liquid does not reach the housing exterior 48. Alternatively, a device for applying a gas to a workpiece on the rotor 20 can be arranged in the housing interior 49. If the housing 40 is embodied to be gas-tight, it may be achieved that the gas does not reach the housing exterior 48. In this case, an additional suction may be provided to remove the gas from the interior 49 of the housing before the movable door 41 is opened.

After processing the workpiece inside of the housing 49, the movable door 41 can be opened again and the rotor 20 can be moved back out of the housing 40.

Figure 6:
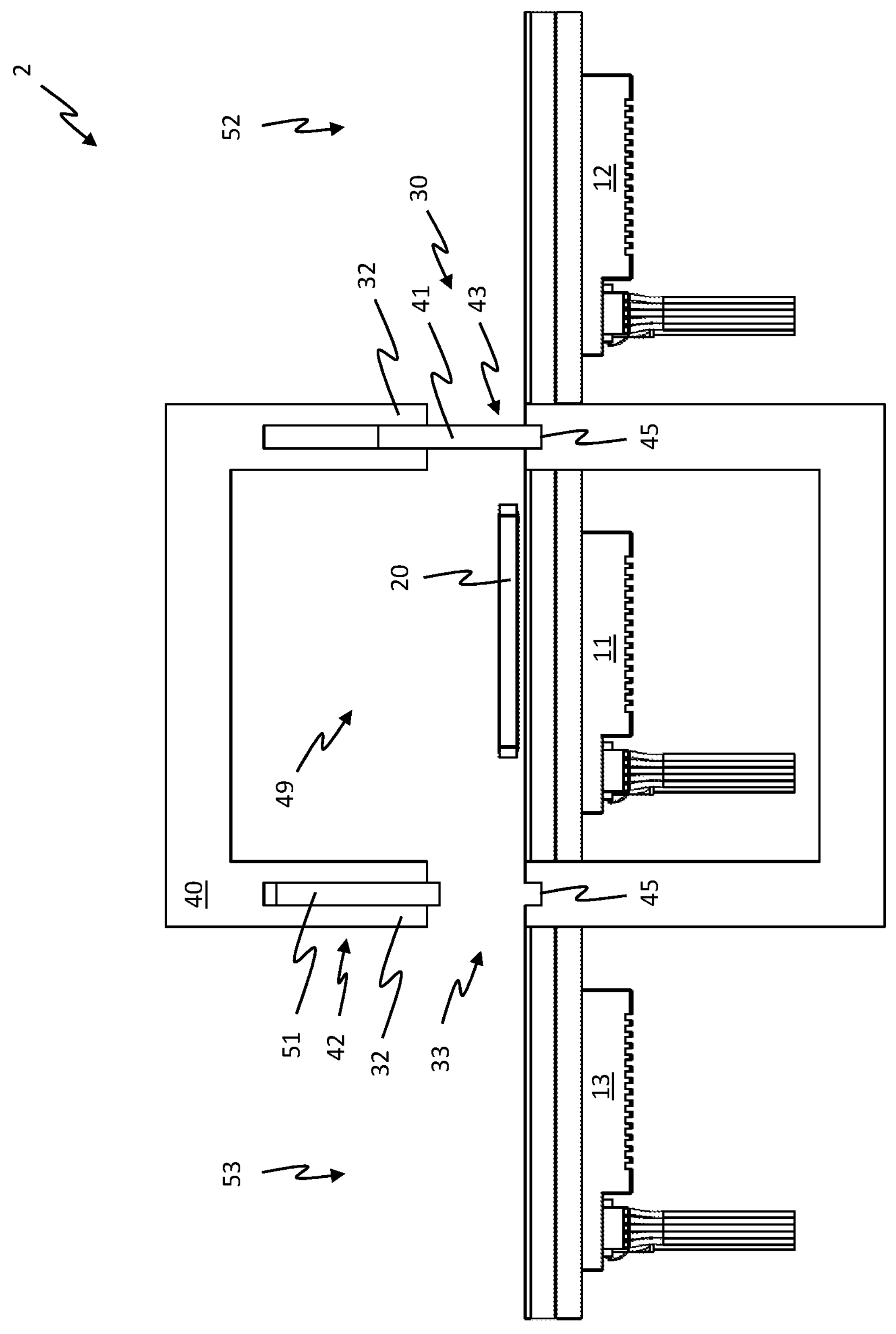
FIG. 6 shows a cross-section of a stator module assembly as a lock.

FIG. 6 shows a cross-section of the assembly 2 of FIG. 5, unless differences are described below. The assembly 2 of stator modules 10 comprises a third stator module 13. The third stator module 13 is arranged at a distance from the first stator module 11, thereby forming a further gap 33 which in its dimensions may correspond to the gap 30. The third stator module 13 is arranged outside the housing 40, so that the housing 40 encloses the first stator element 11. In the area of the further gap 33, the housing 40 has a further movable door 51 which is in an open position 42 but can be closed in a manner analogous to the movable door 41. For this purpose, the housing 40 comprises a further recess 45 in the region of the further gap 33.

The assembly 2 according to FIG. 6 can also serve to accommodate a processing station as explained for FIGS. 4 and 5. A workpiece arranged on the rotor 20 can then be moved from the second stator module 12 into the housing 40 and be processed there. Subsequently, the rotor 20 can leave the housing 40 again through the further movable door 51. This allows for simpler process sequences, since in contrast to the assembly 2 according to FIGS. 4 and 5, the rotor 20 does not have to be moved back, but can be moved in a continuous movement in one direction.

A housing 40 as shown in FIG. 6 can alternatively or additionally be used as a lock. A first housing exterior 52 in the area of the second stator module 12 can be separated from a second housing exterior 53 in the area of the third stator module 13. If only either the movable door 41 or the further movable door 51 is opened in each case, the housing interior 49 is connected only to the first housing exterior 52 or only to the second housing exterior 53. The second housing outer 53 can e.g. be arranged in a vacuum chamber. After the rotor 20 has been moved from the first housing exterior 52 into the housing interior 49 while the further movable door 51 was closed, the movable door 41 can now also be closed. The housing interior 49 is then separated from both the first housing exterior 52 and the second housing exterior 53. If the housing interior 49 is now evacuated, i.e. a vacuum is generated in the housing interior 49, the further movable door 51 can then be opened and the rotor can be moved into the vacuum chamber comprising the second housing exterior 53. An identical procedure may be used if the second housing exterior 53 is arranged in a clean room and/or a protective gas chamber.

Figure 7:
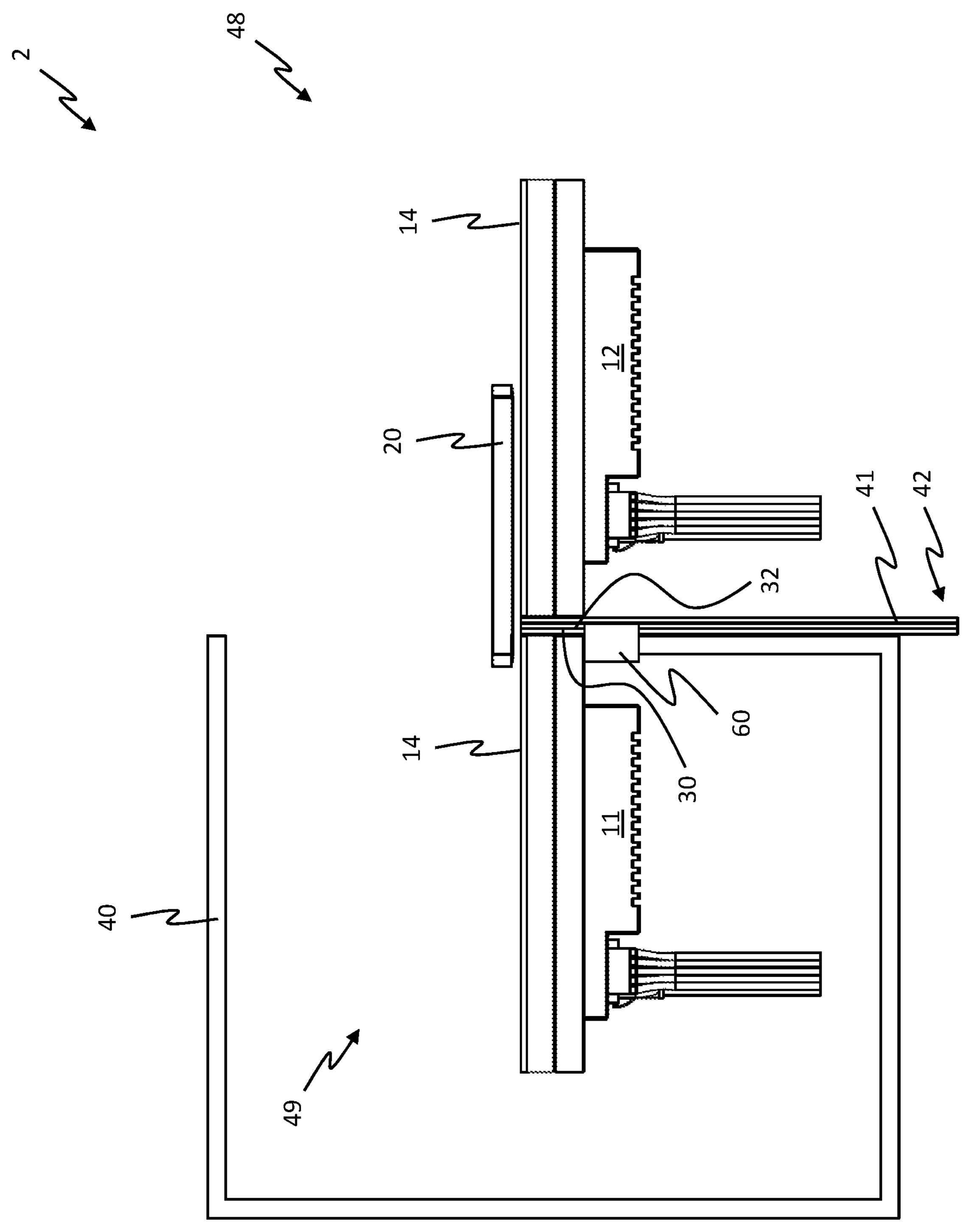
FIG. 7 shows a cross-section of another stator module assembly with a housing and an open door.

FIG. 7 shows a cross-section of an assembly 2 of stator modules 10, which essentially corresponds to the assembly 2 of FIG. 4, unless differences are described below. In the open position 42, the movable door 41 is arranged completely below the stator surfaces 14 of the first stator module 11 or of the second stator module 12, respectively. The rotor 20 is arranged in an intermediate position between the second stator module 12 and the first stator module 11 above the movable door 41. Furthermore, a door drive 60 is still shown in FIG. 7, which can be used to move the movable door 41.

Figure 8:
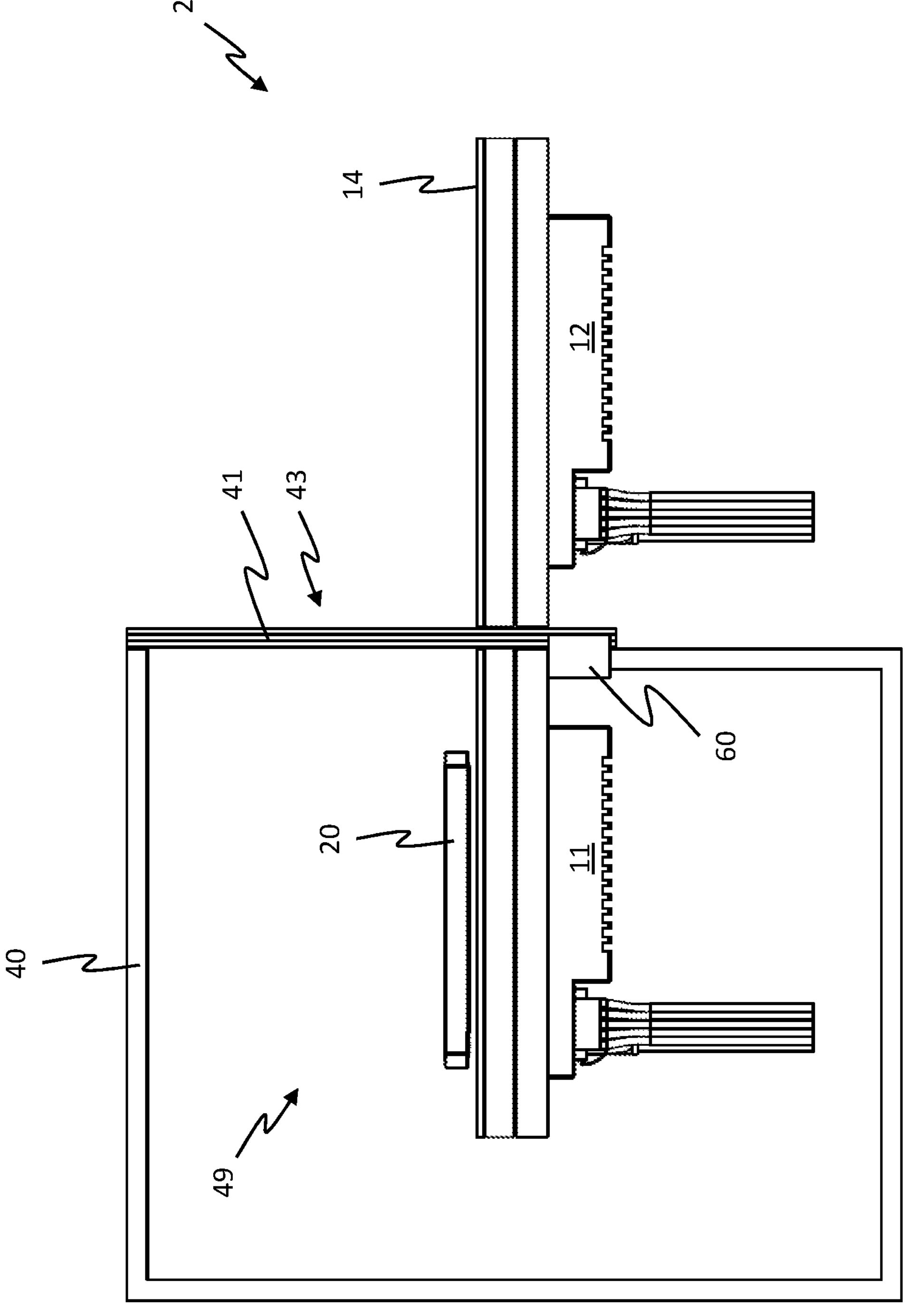
FIG. 8 shows a cross-section of another stator module assembly having a housing and a closed door.

FIG. 8 shows a cross-section through the assembly 2 of FIG. 7 after the rotor 20 has been moved completely into the interior of the housing 49 and the movable door 41 has been brought into the closed position 43. The movable door 41 is now arranged partly above and partly below those of the stator surfaces 14 of the first stator module 11 and the second stator module 12, respectively. As a result, a movement of the movable door 41 in the direction of the first stator module 11 or of the second stator module 12 may be prevented or reduced without having to provide a recess in the housing 40 analogous to FIGS. 4 to 6 by locking the movable door between the first stator module 11 and the second stator module 12.

Analogous to the embodiment example of FIG. 6, a further door can be provided in the housing 40 of FIGS. 7 and 8, as well. The housing 40 can perform the functions described for FIGS. 4 to 6.

The housings 40 of FIGS. 4 to 8 are also part of the invention. For this purpose, the housings 40 may have retaining elements for the first stator module 11. In addition, further retaining elements for further stator modules can also be provided within the housings 40. The first stator module 11 and further stator modules may form a joint component in combination with the housing.

Figure 9:
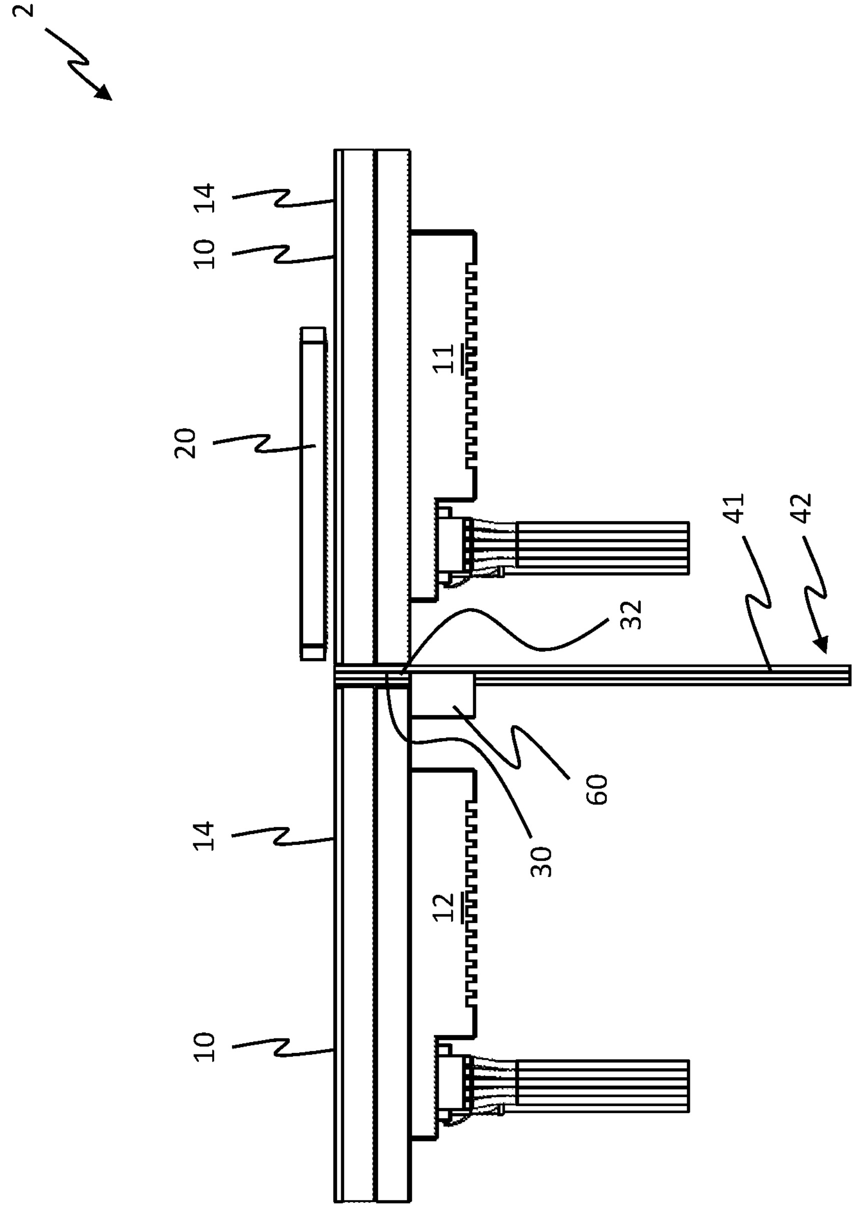
FIG. 9 shows a side view of a stator module assembly with an open door.

FIG. 9 shows a side view of an assembly 2 of stator modules 10, wherein a functional element 32 is arranged in a gap 30 between a first stator module 11 and a second stator module 12, and of a rotor 20. The functional element 32 is embodied in the form of a movable door 41. The movable door 41 is in an open position 42 and, analogously to FIG. 7, in the open position 42 below the stator surfaces 14 of the stator modules 10. Furthermore, the movable door 41 has a door drive 60 by which the movable door 41 can be moved. In this regard, the movable door 41 can serve as a bulkhead between the first stator module 11 and the second stator module 12. The rotor 20 is arranged above the first stator module 11. The movable door 41 can be used to separate areas of the assembly 2 of the stator modules 10 from each other, thus preventing unintentional movement of rotors 20.

Figure 10:
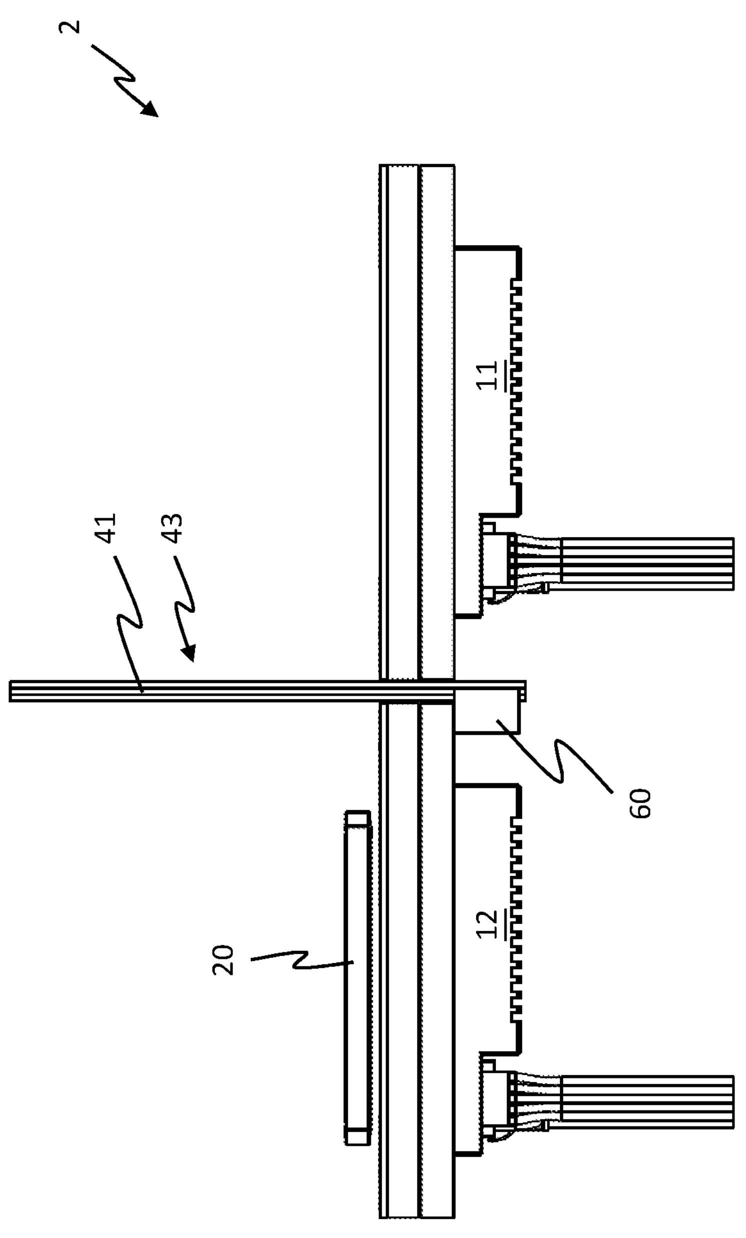
FIG. 10 shows a side view of another stator module assembly with a closed door.

FIG. 10 shows the assembly 2 of FIG. 9 after the rotor 20 has been moved across the gap 30 and thus to the second stator module 12, and thereafter the movable door 41 has been moved to a closed position 43. The movable door 41 is now arranged partly above and partly below those of the stator surfaces 14 of the first stator module 11 and the second stator module 12, respectively. Thus, a movement of the movable door 41 in the direction of the first stator module 11 or the second stator module 12 may be prevented or reduced analogously to FIG. 8.

Figure 11:
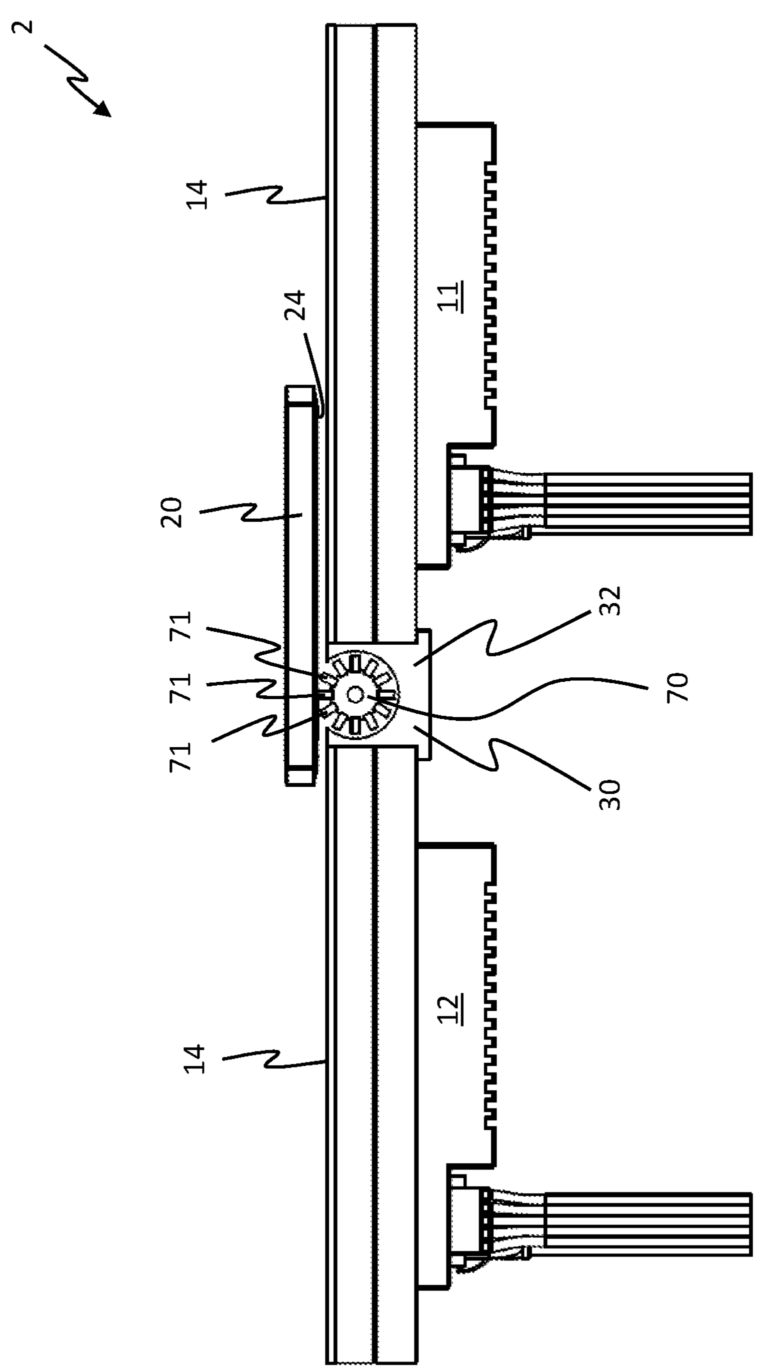
FIG. 11 shows a side view of a stator module assembly with a cleaning brush.

FIG. 11 shows a side view of an assembly 2 of a first stator module 11 and a second stator module 12 and a rotor 20. A gap 30 with a functional element 32 arranged in the area of the gap 30 is arranged between the first stator module 11 and the second stator module 12. For clarity, the functional element 32 is shown in cross-section. The functional element 32 has a cleaning brush 70. The functional element 32 with the cleaning brush 70 is arranged in the gap 30 in such a way that individual bristles 71 project beyond the stator surfaces 14 in the region of the gap 30 and the functional element 32 is otherwise arranged below the stator surfaces 14. The bristles 71 of the cleaning brush 70 projecting beyond the stator surfaces 14 are partially in mechanical contact with the rotor 20. It may be provided that the cleaning brush 70 is stationary and a cleaning effect is produced by moving the rotor 20 across the gap 30 with the cleaning brush 71, thereby removing dirt from an underside 24 of the rotor 20. Alternatively, the cleaning brush 70 can be embodied to rotate. Dirt from the underside 24 of the rotor 20 can then be removed both by rotating the cleaning brush 70 and by moving the rotor 20 over the cleaning brush 70.

It may be provided that the functional element 32 having the cleaning brush 70 can be moved downward perpendicular to the stator surfaces 14. This can be used to control whether or not the cleaning brush 70 comes into mechanical contact with a rotor 20 moving across the gap 30.

Figure 12:
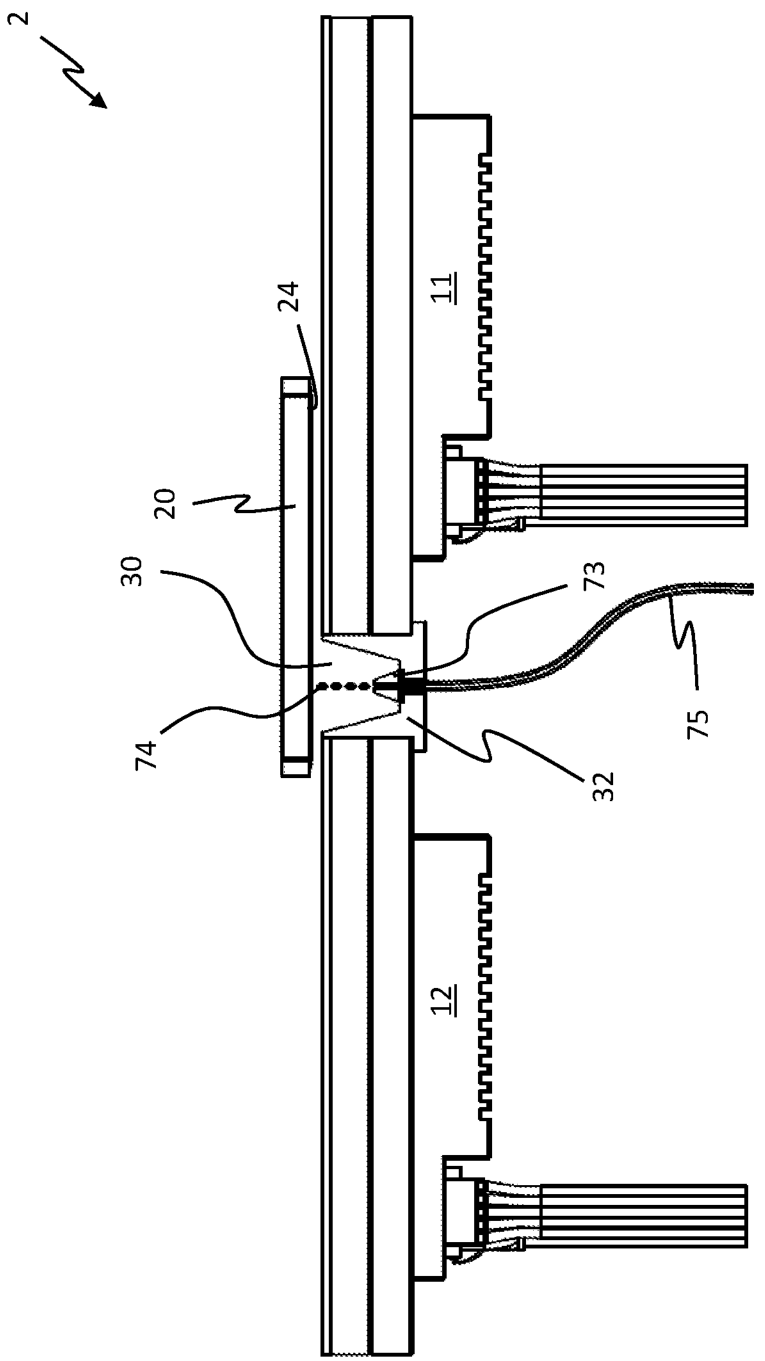
FIG. 12 shows a side view of a stator module assembly with a nozzle for applying a fluid.

FIG. 12 shows a side view of an assembly 2 of a first stator module 11 and of a second stator module 12 and of a rotor 20. A gap 30 with a functional element 32 arranged in the area of the gap 30 is arranged between the first stator module 11 and the second stator module 12. For clarity, the functional element 32 is shown in cross-section. The functional element 32 has a nozzle 73 for applying a fluid 74. The fluid 74 may comprise a gas or a liquid and can be transported to the nozzle 73 by a connecting tube 75. After exiting the nozzle 73, the fluid 74 impacts an underside 24 of the rotor 20. The fluid 74 may comprise a compressed air that can be used to remove, for example, dust or chips from the underside 24 of the rotor 20. The fluid 74 may comprise a cleaning fluid or a disinfecting fluid. If the fluid 74 is a disinfecting fluid, the functional element 32 may be referred to as a disinfecting element.

Figure 13:
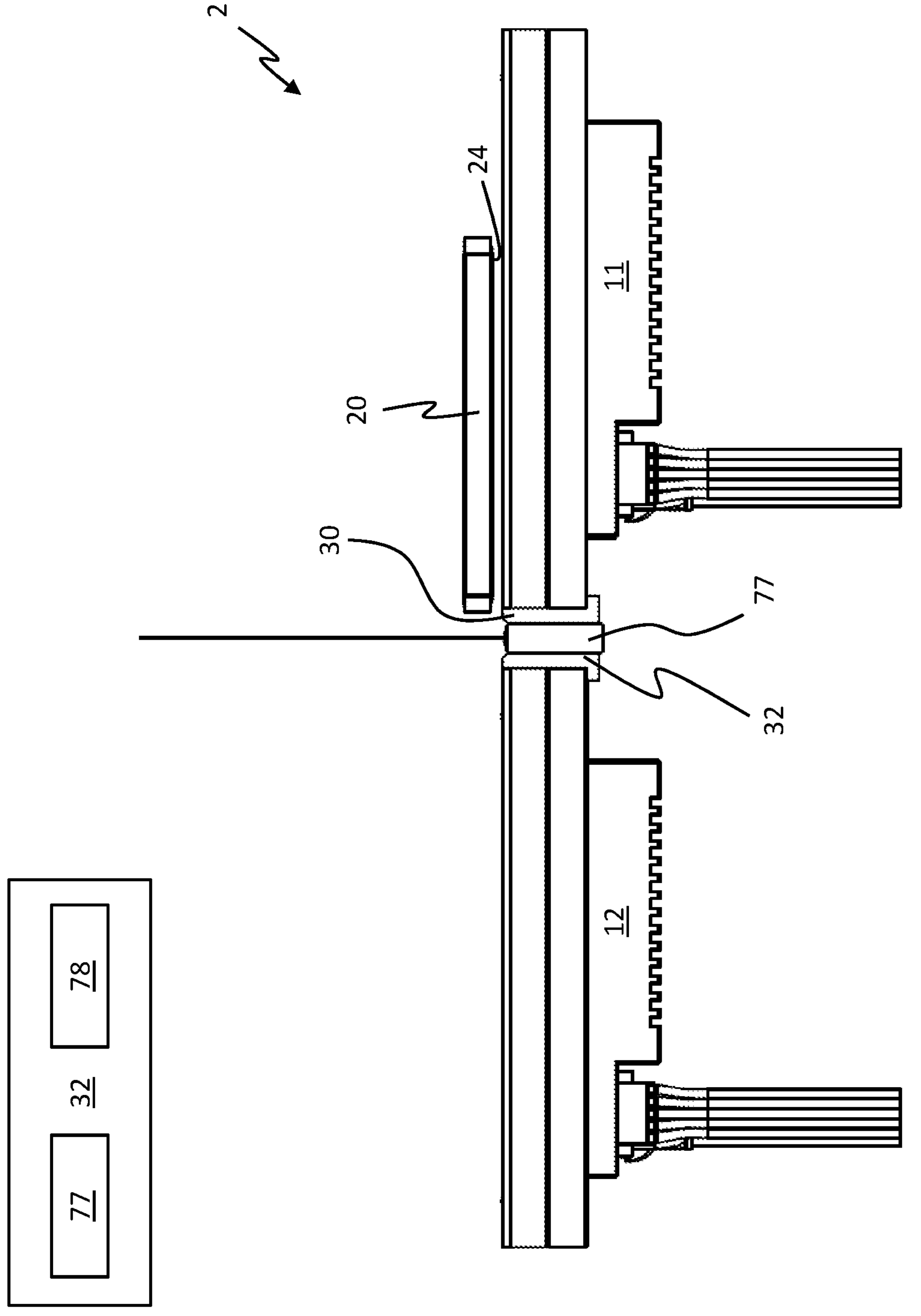
FIG. 13 shows a side view of an assembly of stator modules having a light source.

FIG. 13 shows a side view of an assembly 2 of a first stator module 11 and of a second stator module 12 and of a rotor 20. A gap 30 is arranged between the first stator module 11 and the second stator module 12 with a functional element 32 arranged in the area of the gap 30. The functional element 32 includes a light source 77 that can be used to illuminate an underside 24 of the rotor 20. The functional element 32 may further comprise a light detector 78 arranged behind or in front of the light source, which is not shown in the side view of FIG. 12. FIG. 13 further shows a top view of the functional element 32 with light source 77 and light detector 78. With the light source 77 and the light detector 78, e.g. a bar code arranged on the underside 24 of the rotor 20 can be read.

In an alternative embodiment, the functional element 32 is constructed as shown in the cross-section of FIG. 13, but does not include a light detector 78. The light source 77 can then be configured as a UV light source, for example, wherein the underside 24 of the rotor 20 can be disinfected by UV radiation emitted by the UV light source. Such a functional element 32 may also be referred to as a disinfection element.

In another alternative embodiment of the functional element 32, the light detector 78 is provided, but not the light source 77. In this case, the light detector may e.g. comprise a camera that can also be used to read a bar code on the bottom surface 24 of the rotor 20.

Figure 14:
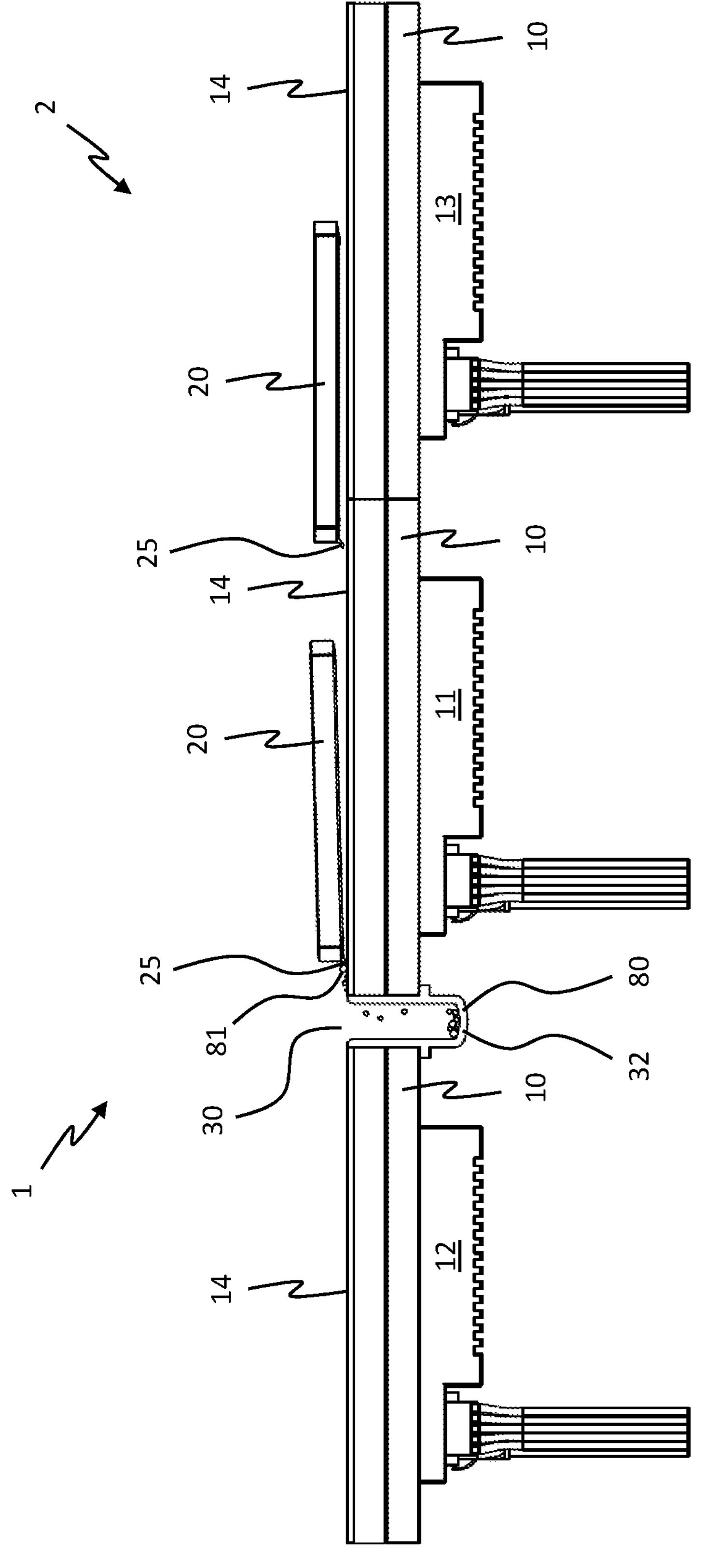
FIG. 14 shows a side view of a stator module assembly having a collecting vessel.

FIG. 14 shows a side view of an assembly 2 of stator modules 10 each having a stator surface 14, wherein a gap 30 is arranged between a first stator module 11 and a second stator module 12. On the opposite side of the gap 30, a third stator module 13 is arranged adjacent to the first stator module 11. A functional element 32 is arranged in the gap 30 and has a collecting vessel 80 for dirt particles 81 located on the stator surfaces 14. For clarity, the functional element 32 is shown in cross-section. Two rotors 20 are arranged above the stator surfaces 14, each having a rake blade 25. The rotors 20 with the rake blades 25 can be held in an inclined position by magnetic fields generated by the stator modules 10 in such a way that the rake blades 25 rest on the stator surfaces 14. If the rotors 20 are then moved, the dirt particles 81 can be moved towards the gap 30 and enter the collecting vessel 80. As a result, the stator surfaces 14 can be kept clean. In a planar drive system 1 comprising the assembly 2 and the rotors 20, it may be provided that not all of the rotors 20 comprise a corresponding rake blade 25.

Figure 15:
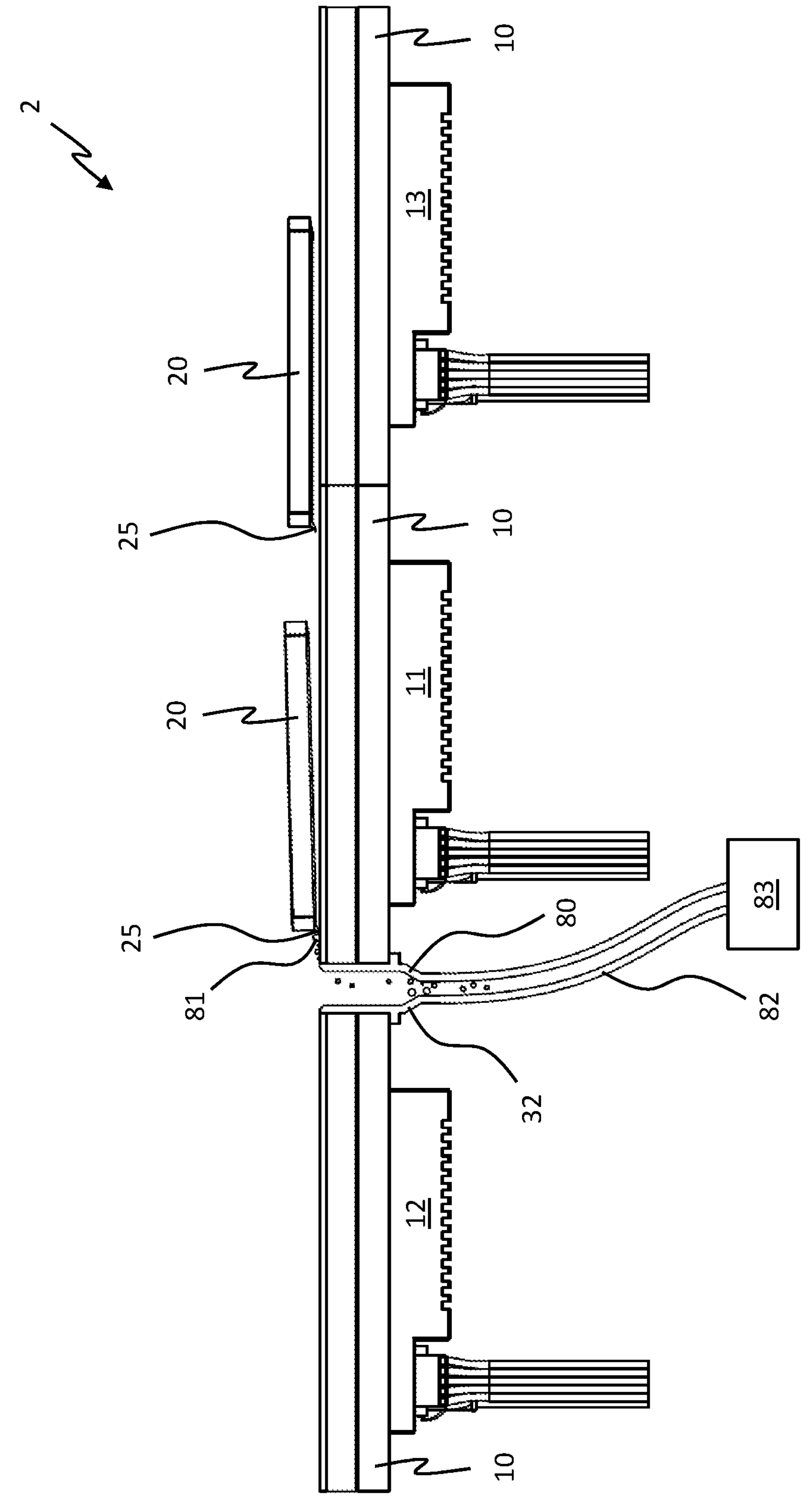
FIG. 15 shows a side view of a stator module assembly with a suction device.

FIG. 15 shows a side view of an assembly 2 of stator modules 10 corresponding to the assembly 2 of FIG. 14, unless differences are described below. The collecting vessel 80 also has a tube 82 leading to a suction device 83. As a result, dirt particles 81 are not only collected in the collecting vessel 80, but are removed with the suction device 83, thus keeping the assembly 2 clean.

Figure 16:
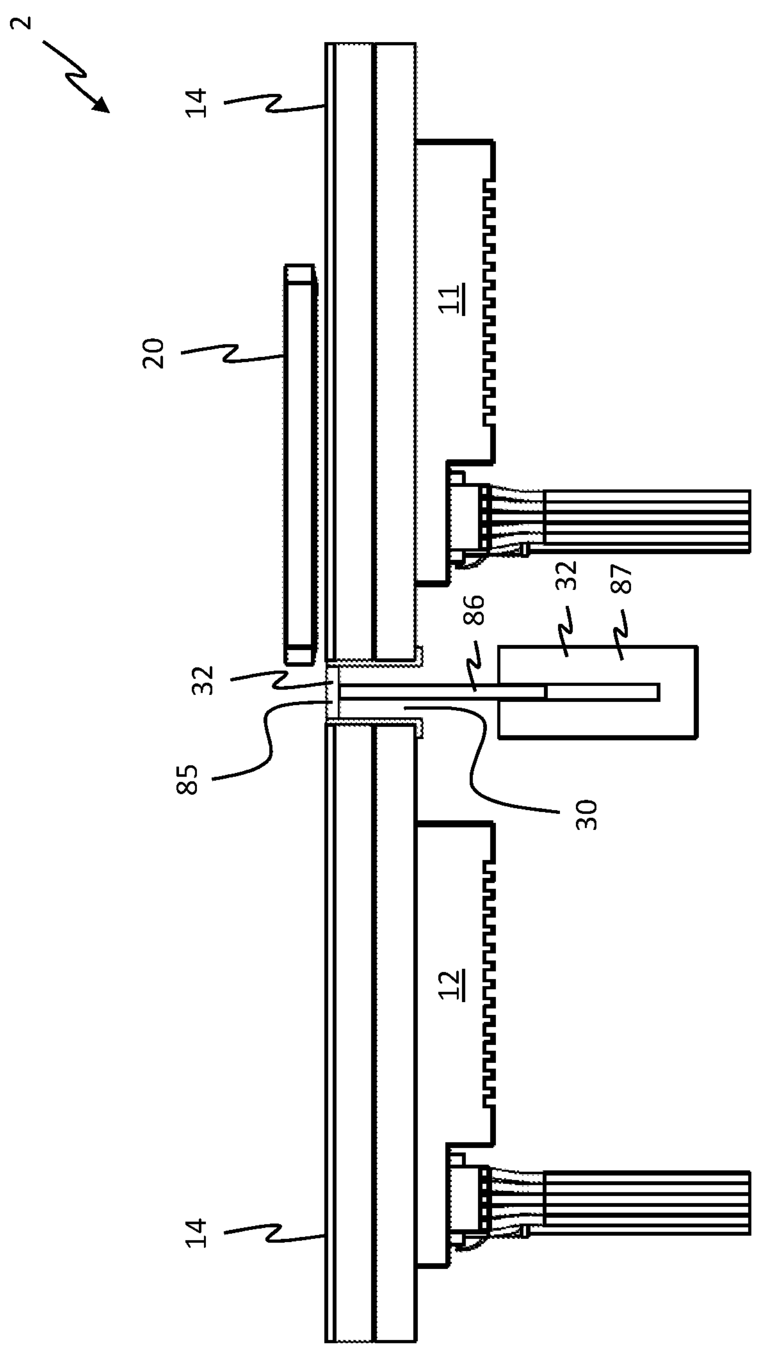
FIG. 16 shows a side view of a stator module assembly with a cover.

FIG. 16 shows a side view of an assembly 2 of a first stator module 11 and a second stator module 12 and a rotor 20. A gap 30 with a functional element 32 arranged in the area of the gap 30 is arranged between the first stator module 11 and the second stator module 12. For clarity, the functional element 32 is shown in cross-section. The functional element 32 has a cover 85. The cover 85 is dimensioned such that the cover 85 can at least partially close the gap 30, so that the stator surfaces 14 of the first stator module 11 or of the second stator module 12, respectively, form a continuous surface with the cover 85. FIG. 15 also shows that the cover 85 is connected to a drive 87 by a rod 86, the rod 86 and the drive 87 being optional. With the drive 87 and of the rod 86, the cover can be displaced perpendicular to the stator surfaces 14. This allows the gap 30 to be opened and closed again.

Figure 17:
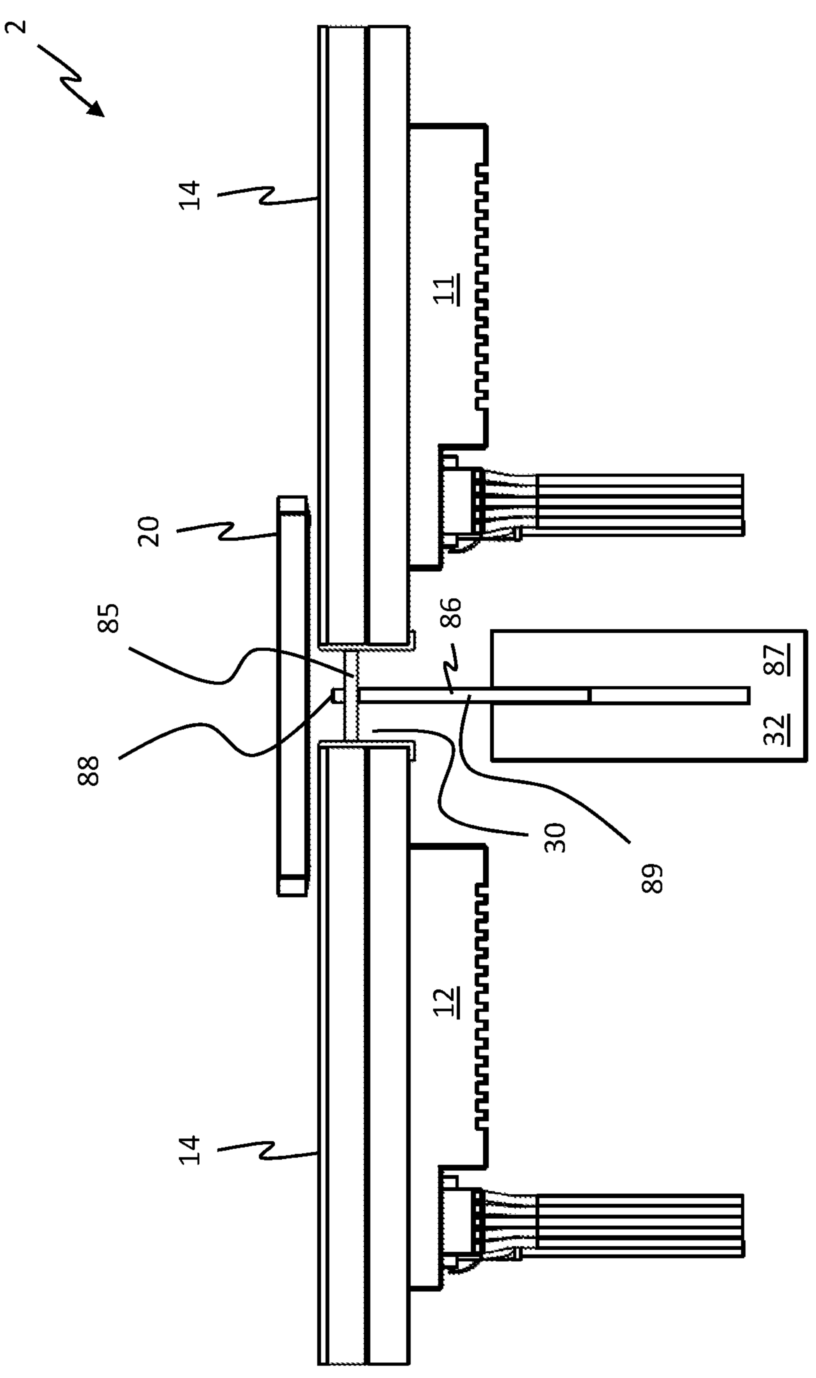
FIG. 17 shows a side view of a stator module assembly with a retaining element.

FIG. 17 shows a side view of an assembly 2 of a first stator module 11 and of a second stator module 12, which essentially corresponds to the assembly 2 of FIG. 16, unless differences are described below. A pin 88 is arranged above the cover 85. A rotor 20 is arranged directly above the gap 30. If the rotor 20 is embodied as shown in FIG. 2 and, in particular, has the receptacle 23, provision can be made to move the cover 85 toward the rotor 20 by the drive 87 until the pin 88 engages in the receptacle 23. This achieves a mechanical fastening of the rotor 20. On the one hand, this can prevent the rotor 20 from moving in parallel to the stator surfaces 14 of the first stator module 11 and of the second stator module 12, respectively, when a workpiece is mechanically processed on the rotor 20. Furthermore, it may be provided to absorb forces perpendicular to the stator surfaces 14 that lead in the direction of the stator surfaces 14 during a processing of the workpiece via the pin 88, the cover 85, the rod 86 and the drive 87 or via a part of said components and thus to reduce or prevent mechanical loads on the stator surfaces 14. In particular, this embodiment makes it possible to ensure that even if the force acting on a workpiece perpendicular to the stator surfaces 14 and in the direction of the stator surfaces 14 during processing of the workpiece is greater than a supporting force provided by the first stator module 11 and the second stator module 12, respectively, via magnetic fields generated thereby, the rotor 20 nevertheless does not rest on the stator surfaces 14. The cover 85, the rod 86 and the pin 88 thus form a retaining element 89.

Figure 18:
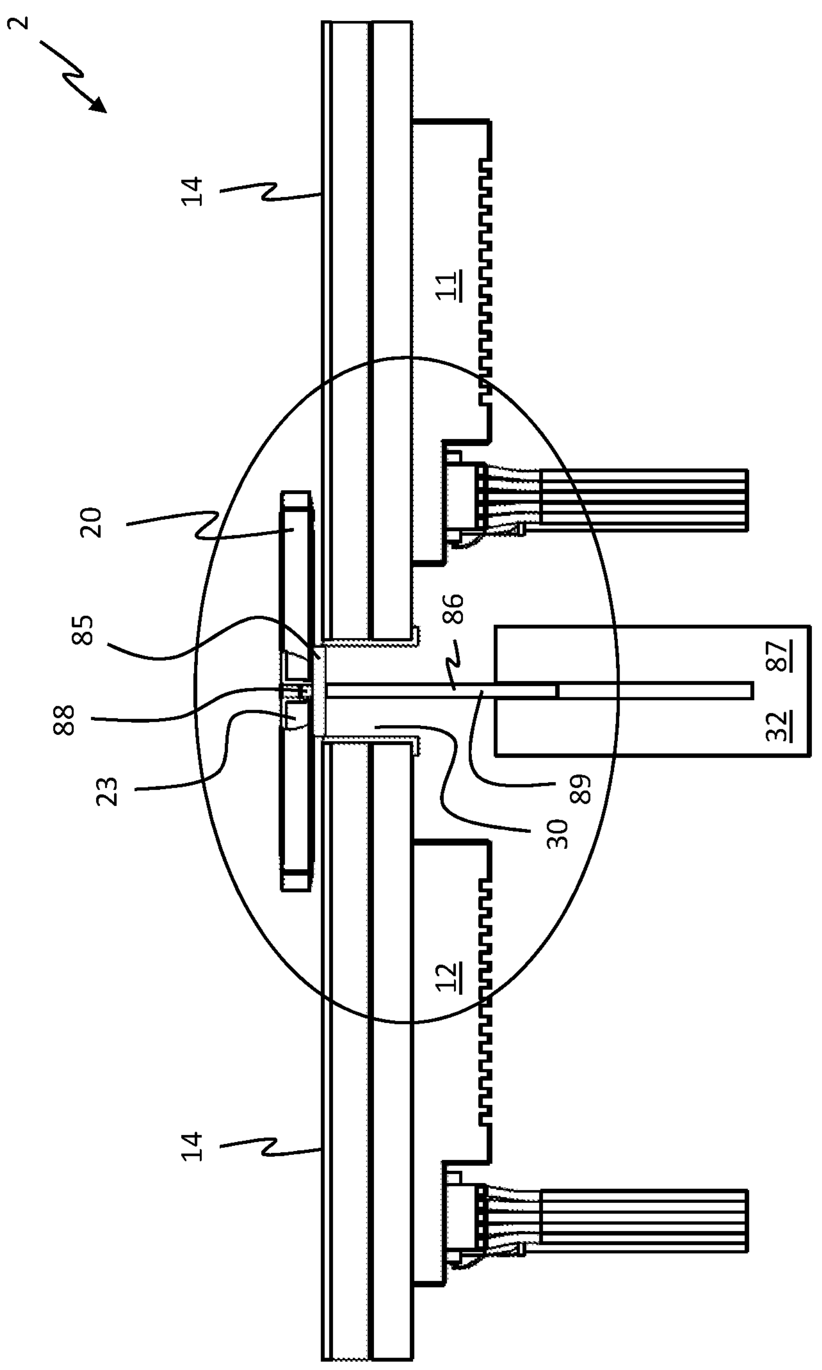
FIG. 18 shows a side view of the stator module assembly with the retaining element engaging a rotor.

FIG. 18 shows the assembly 2 of FIG. 17, with the cover 85 engaging with the pin 88 in the receptacle 23 of the rotor 20. The rotor 20 is now fixed in parallel to the stator surfaces 14 and can no longer be pressed onto the stator surfaces 14, either.

Figure 19:
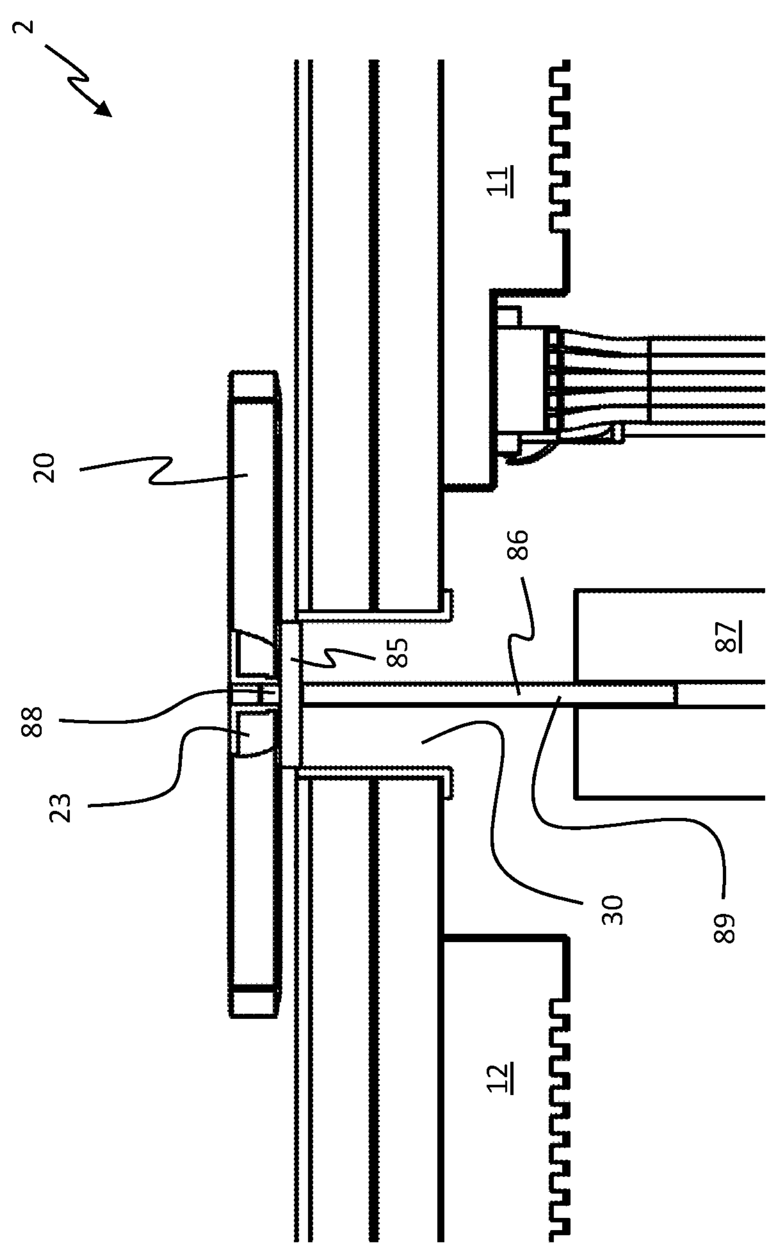
FIG. 19 shows an enlarged view of the engagement between the retaining element and the rotor of FIG. 18.

FIG. 19 shows an enlarged view of the receptacle 23 and of the pin 88 of FIG. 18. In FIGS. 18 and 19, the rotor 20 is shown in a partially sectional view to illustrate the engagement of the pin 88 in the receptacle 23 of the rotor 20. For reasons of clarity, hatching of the cut surfaces has been omitted.

In the embodiment example shown in FIGS. 17 to 19, the cover 85 is approximately as wide as the gap 30. In alternative embodiments, the cover 85 can be sized differently as long as the cover is not larger than the gap 30. Furthermore, in the embodiment shown in FIGS. 17 to 19, the rotor 20 can be rotated about the pin 88. In alternative embodiments, it may be provided that the cover 85 has a plurality of pins 88 and the rotor 20 has a plurality of receptacles 23, each pin 88 being engageable with a receptacle 23. In that case, rotation of the rotor 20 is no longer possible, either.

Figure 20:
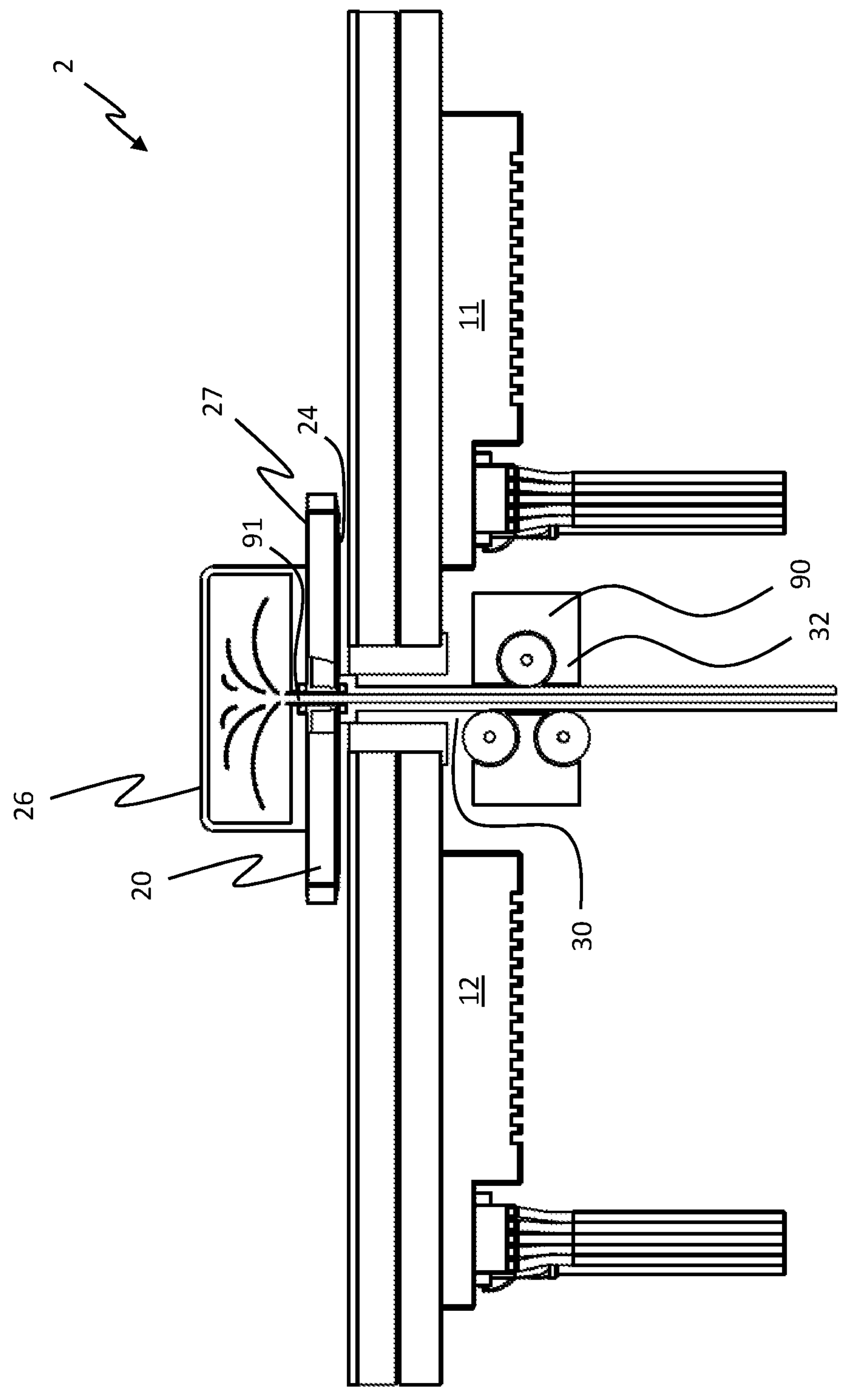
FIG. 20 shows a side view of a stator module assembly with a fill-up element.

FIG. 20 shows a side view of an assembly 2 of a first stator module 11 and of a second stator module 12 and of a rotor 20. A gap 30 is arranged between the first stator module 11 and the second stator module 12 with a functional element 32 arranged in the area of the gap 30. The rotor 20 comprises a tank 26 on an upper side 27 of the rotor 20, e.g. for a liquid and/or a gas. The functional element 32 has a fill-up device 90. With an extendable nozzle 91, the tank 26 of the rotor 20 can be filled with a liquid and/or a gas. The extendable nozzle 91 can be arranged between the first stator module 11 and the second stator module 12 in the gap 30. If the rotor 20 with the tank 26 is moved across the gap, the extendable nozzle 91 can engage the tank 26 from an underside 24 of the rotor 20. Now, liquids and/or gases can be transferred into the tank 26. After the tanking process is complete, the extendable nozzle 91 can be moved back into the gap 30. In FIG. 20, the rotor 20 with the tank 26 as well as the functional element 32 with the extendable nozzle 91 are shown in a partially sectional view in order to depict the engagement of the extendable nozzle 91 in the tank 26 of the rotor 20. For reasons of clarity, hatching of the sectional surfaces has been omitted.

The embodiments of the assembly 2 of the stator modules 10 shown in FIGS. 1 to 20 can each be arranged on the carrier device disclosed in German patent application DE 10 2017 131 324.9 of 27 Dec. 2017, published as DE 10 2017 131 324 A1. In particular, the carrier device shown in FIG. 17 of German patent application DE 10 2017 131 324.9 of 27 Dec. 2017 can be used as an alternative to the stator module assembly without distance disclosed in this application to form the column 30, since here stator modules can be arranged spaced apart from each other between the carrier elements. With regard to the carrier device, express reference is made to German patent application DE 10 2017 131 324.9 of 27 Dec. 2017, and the contents of German patent application DE 10 2017 131 324.9 of 27 Dec. 2017 with regard to the carrier device are incorporated by back-reference.

The functional elements 32 arranged in the gap 30 of FIGS. 9 to 20 are also part of the present invention if they are embodied in such a way that, on the one hand, they can be arranged in the gap 30 between the first stator module 11 and the second stator module 12 and, on the other hand, their dimensions are embodied in such a way that the maximum value of the gap width 31 is not exceeded.

Figure 21:
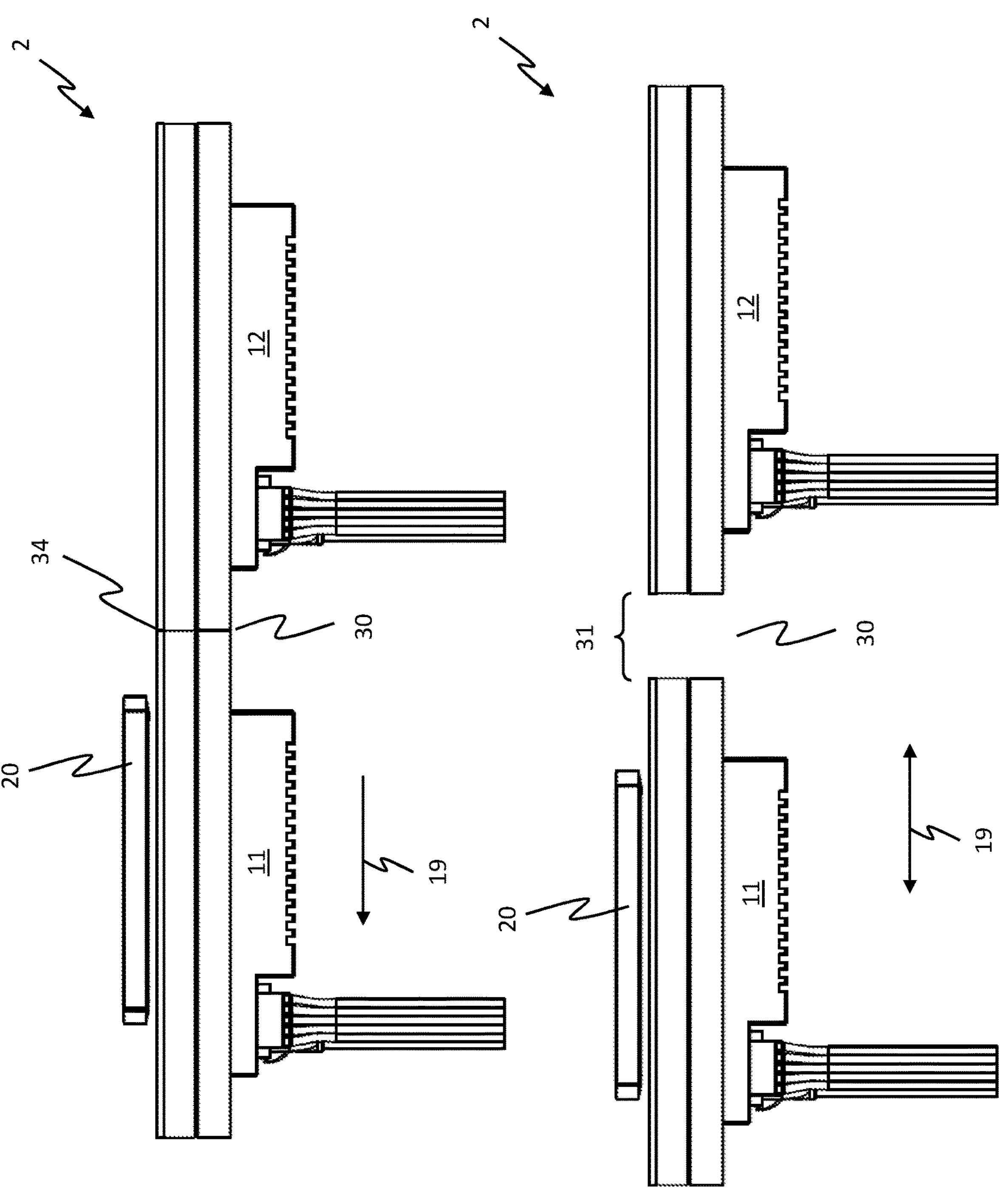
FIG. 21 shows a side view of a stator module assembly with a variable gap width.

FIG. 21 shows two side views of a further embodiment of an assembly 2 of a first stator module 11 and of a second stator module 12 and of a rotor 20. The first stator module 11 is arranged movably and can be moved in a direction of movement 19. As a result, a gap 30 between the first stator module 11 and the second stator module 12 is variable in its gap width 31. In the upper illustration of FIG. 21, the gap 30 is embodied as a closed gap 34. The first stator module 11 is directly adjacent to the second stator module 12. The direction of movement 19 is restricted in this case, a movement of the first stator module 11 is only possible away from the second stator module 12. In the lower illustration of FIG. 21, the gap 30 is open and may correspond to the gap 30 of the embodiment example of FIG. 1.

The rotor 20 is arranged above the first stator module 11. In particular, the rotor 20 may remain arranged above the first stator module 11 during the movement of the first stator module 11 and thus be moved along in the direction of movement 19.

Figure 22:
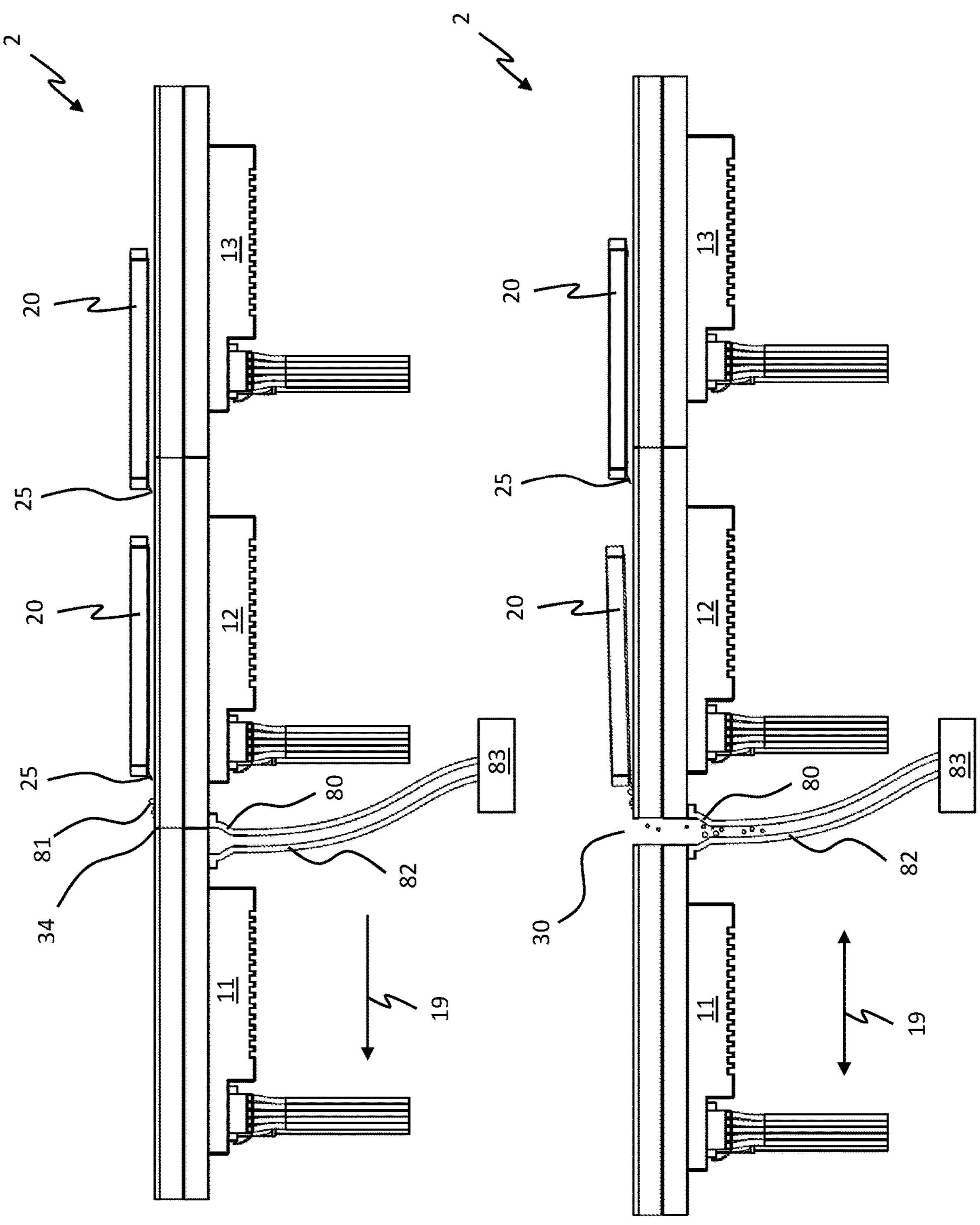
FIG. 22 shows a side view of a stator module assembly with a suction device and variable gap width.

FIG. 22 shows two side views of a further embodiment of an assembly 2 of a first stator module 11, of a second stator module 12 and of a third stator module 13 with a plurality of rotors 20, which is a combination of the embodiments of FIGS. 15 and 21. The collecting vessel 80 is arranged below the first stator module 11. In the upper illustration, the first stator module 11 is adjacent to the second stator module 12, analogous to FIG. 21, and the collecting vessel 80 is thus not accessible. If the first stator module 11 is now moved away from the second stator module 12 in the direction of movement 19, this opens the gap 30 and the collecting container 80 arranged below the gap 30 becomes accessible. The rotors 20, which are embodied analogously to FIG. 15, can then move dirt particles 81 in the direction of the gap 30 and thus into the collecting vessel with the rake blades 25. The collecting vessel 80 comprise a tube 82 that leads to a suction device 83. The dirt particles 81 are then not only collected in the collecting vessel 80, but removed by the suction device 83, thus keeping the assembly 2 clean.

This makes it possible to provide a continuous stator surface 14 without gap 30 during normal operation and to e.g. open gap 30 for cleaning purposes only. A plurality of assemblies corresponding to FIG. 22 can be provided in one planar drive system 1.

Figure 23:
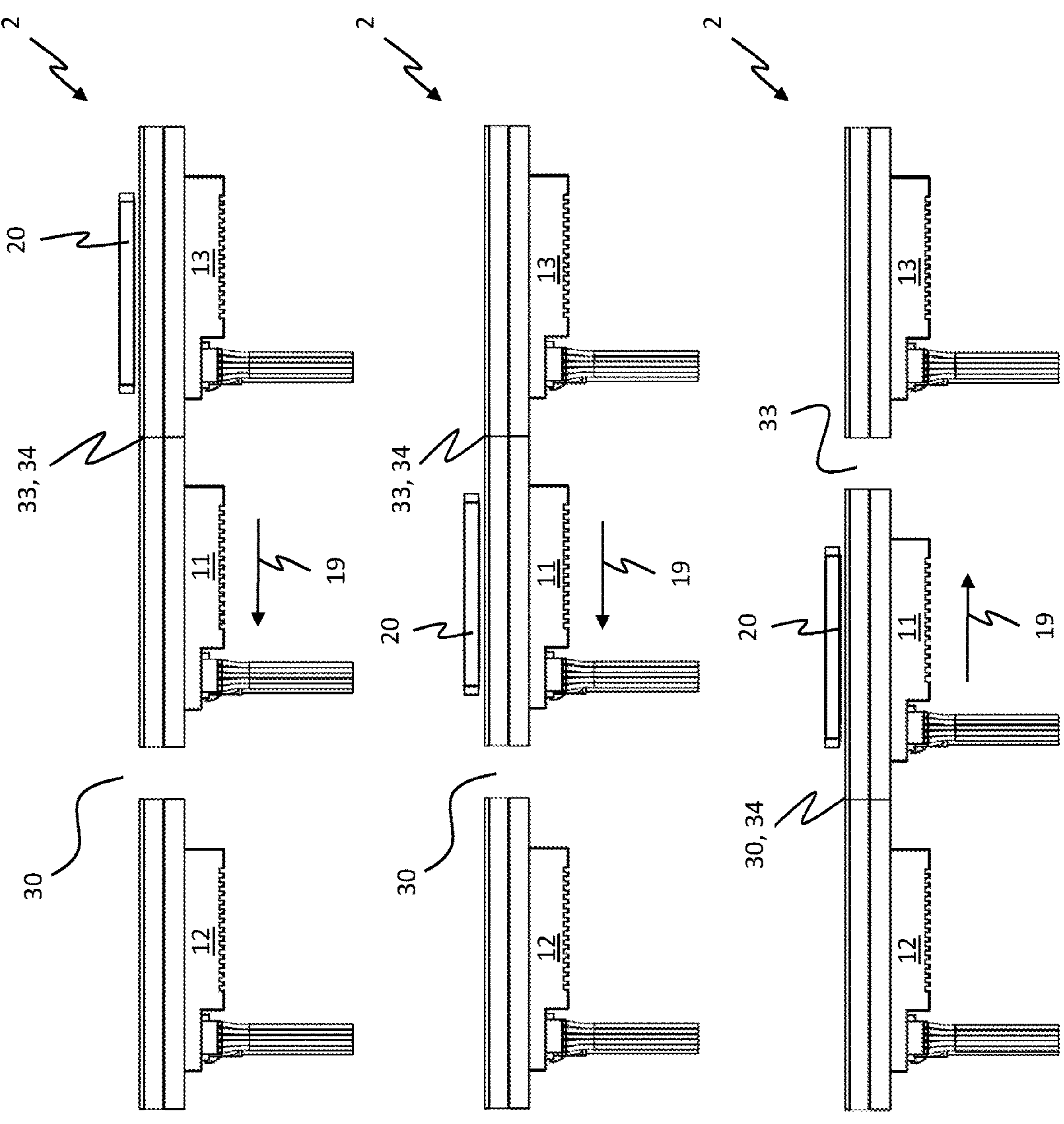
FIG. 23 shows a side view of a stator module assembly with a variable gap width for use as a ferry.

FIG. 23 shows three side views of an assembly 2 of a first stator module 11, of a second stator module 12 and of a third stator module 13 as well as of a rotor 20. The first stator module 11 is arranged movably and can be moved in a direction of movement 19 in the direction of the second stator module 12 or in the direction of the third stator module 13. In the upper depiction, the first stator module 11 is directly adjacent to the third stator module 13 and is spaced apart from the second stator module 12. A gap 30 is arranged between the first stator module 11 and the second stator module 12. Another gap 33 is arranged between the first stator module 11 and the third stator module 13, which is a closed gap 34 in the upper depiction. The rotor 20 is arranged above the third stator module 13.

In the middle depiction of FIG. 23, the first stator module 11, the second stator module 12 and the third stator module 13 are arranged as in the first depiction. The rotor 20 is now located above the first stator module 11.

In the bottom depiction of FIG. 23, the first stator module 11 has been moved toward the second stator module 12 so that the first stator module 11 is now adjacent to the second stator module 12. The gap 30 is now a closed gap 34, while the further gap 33 is now open. The rotor 20 can now be moved from the first stator module 11 to the second stator module 12.

Thus, the first stator module 11 of the assembly 2 of FIG. 23 may serve to move the rotor from the third stator module 13 to the second stator module 12 without having to move the rotor 20 across the opened gap 30 or the opened further gap 33 by moving the first stator module 11 along with the rotor 20. Thus, the movable first stator module 11 may serve to transfer the rotor 20 from a first facility section of a planar drive system to a second facility section of a planar drive system. The third stator module 13 may then be part of the first facility section. The second stator module 12 may then be part of the second facility section.

TABLE 1

| List of Reference Numerals: 1-78 |
|---|
| 1 planar drive system |
| 2 assembly |
| 3 first area |
| 4 second area |
| 10 stator module |
| 11 first stator module |
| 12 second stator module |
| 13 third stator module |
| 14 stator surface |
| 15 first surface of movement |
| 16 second surface of movement |
| 17 first extension |
| 18 second extension |
| 19 direction of movement |
| 20 rotor |
| 21 magnet unit |
| 22 magnet arrangement |
| 22-1 first magnet arrangement |
| 22-2 second magnet arrangement |
| 22-3 third magnet assembly |
| 22-4 fourth magnet assembly |
| 23 receptacle |
| 24 bottom |
| 25 rake blade |
| 26 tank |
| 27 top |
| 30 gap |
| 31 gap width |
| 32 functional element |
| 33 further gap |
| 34 closed gap |
| 40 housing |
| 41 movable door |
| 42 open position |
| 43 closed position |

TABLE 1-continued

| List of Reference Numerals: 1-78 |
|---|
| 44 housing wall thickness |
| 45 recess |
| 46 door thickness |
| 47 recess width |
| 48 housing exterior |
| 49 housing interior |
| 51 further movable door |
| 52 first housing exterior |
| 53 second housing exterior |
| 60 door drive |
| 70 cleaning brush |
| 71 bristle |
| 73 nozzle |
| 74 fluid |
| 75 connecting tube |
| 77 light source |
| 78 light detector |

TABLE 2

| List of Reference Numerals: 80-98 |
|---|
| 80 collecting vessel |
| 81 dirt particles |
| 82 tube |
| 83 suction device |
| 85 cover |
| 86 rid |
| 87 drive |
| 88 pin |
| 89 retaining element |
| 90 fill-up device |
| 91 extendable nozzle |
| 93 stator segment |
| 94 further stator segment |
| 95 segment width |
| 96 conductor strips |
| 97 first stator layer |
| 98 second stator layer |
| X first drive direction |
| Y second drive direction |
| Λ magnetization period width |

The invention claimed is:

1. An assembly of stator modules for a planar drive system, comprising:

a first stator module and a second stator module, the first stator module and the second stator module each having a stator surface, the stator surfaces each forming a continuous surface for movement of a rotor in a first area and in a second area, the first stator module and the second stator module each comprising a first stator layer and a second stator layer, which are arranged on top of each other at right angles; and wherein stator segments are arranged in the first stator layer and the second stator layer, wherein the stator segments of the first stator layer are arranged perpendicular to the stator segments of the second stator layer, the stator segments having a segment width and being configured such that they are energizable, each stator segment comprising six conductor strips which are configured as a three-phase system;

wherein the stator segments are configured to provide a magnetic field for interacting with magnet arrangements of the rotor of the planar drive system in order to drive and/or hold the rotor, the magnetic field being configured to maintain the rotor in a vertical position at a distance from the stator module surfaces and to move it in a horizontal direction; and wherein the first stator module and the second stator module are arranged at a distance from one another and a gap is formed thereby, wherein the gap has a gap width, wherein the gap width is smaller than or equal to the stator segment width.

2. The assembly of stator modules according to claim 1, wherein the first stator module is arranged in a moveable manner, wherein the first stator module is movable in such a way that the gap width is variably changed.

3. The assembly of stator modules according to claim 1, wherein at least one functional element is arranged in the region of the gap.

4. The assembly of stator modules according to claim 3, wherein the functional element comprises a movable door.

5. The assembly of stator modules according to claim 4, wherein the movable door has a closed position and an open position, wherein in the closed position the movable door is partially arranged within the gap between the first stator module and the second stator module.

6. The assembly of stator modules according to claim 5, wherein a housing encloses at least the first stator module with the movable door, wherein the housing is configured to be gas-tight and/or fluid-tight and/or particle-tight.

7. The assembly of stator modules according to claim 6, wherein the housing comprises a further movable door, wherein the assembly of stator modules comprises a third stator module, wherein the third stator module and the first stator module are arranged at a distance with regard to each other, thereby forming a further gap, and wherein the further movable door has a closed position and an open position, wherein in the closed position the further movable door is arranged partially within the further gap between the first stator module and the third stator module.

8. The assembly of stator modules according to claim 3, wherein the functional element comprises a light source and a light detector, wherein the light source and the light detector are configured to carry out a detection of a moving rotor and/or a detection of a movement of an object between the light source and the light detector.

9. The assembly of stator modules according to claim 3, wherein said functional element provides an air curtain.

10. The assembly of stator modules according to claim 3, wherein the functional element comprises a cleaning brush, wherein the cleaning brush is configured to be stationary and/or rotatable.

11. The assembly of stator modules according to claim 3, wherein the functional element comprises a nozzle for applying a fluid.

12. The assembly of stator modules according to claim 3, wherein the functional element comprises a disinfection element.

13. The assembly of stator modules according to claim 3, wherein the functional element comprises a suction device.

14. The assembly of stator modules according to claim 3, wherein the functional element comprises a retaining element.

15. A planar drive system having an assembly of stator modules comprising:

a first stator module and a second stator module, the first stator module and the second stator module each having a stator surface, the stator surfaces each forming a continuous surface for movement in a first area and in a second area; and at least one rotor;

wherein the rotor comprises a plurality of magnet arrangements which are effective in a drive direction of the rotor and are arranged next to one another in the drive direction for driving and/or holding the rotor, each having a magnetization period width (λ), wherein the first stator module and the second stator module each comprises a first stator layer and a second stator layer, which are arranged on top of each other at right angles; and wherein stator segments are arranged in the first stator layer and the second stator layer, wherein the stator segments of the first stator layer are arranged perpendicular to the stator segments of the second stator layer, the stator segments having a segment width and being configured to be energizable, the magnetization period width corresponding to the segment width;

wherein the stator segments are configured to provide a magnetic field for interacting with the magnet arrangements of the rotor in order to drive and/or hold the rotor of the planar drive system, the magnetic field being configured to maintain the rotor in a vertical position at a distance from the stator modules and to move it in a horizontal direction; and the first stator module and the second stator module being arranged at a distance from one another and a gap being formed as a result, the gap having a gap width of at most half a number of the magnet arrangements which are effective in a drive direction of the rotor multiplied by the magnetization period width.

16. The planar drive system according to claim 15, wherein the rotor comprises two magnet arrangements effective in the drive direction of the rotor and arranged side by side in the drive direction.

17. The planar drive system according to claim 15, wherein at least one functional element is arranged in the region of the gap.

18. The planar drive system according to claim 15, wherein a minimum gap width is provided.

19. The assembly of stator modules according to claim 1, wherein a minimum gap width corresponds to a width of one of the conductor strips in the stator segments.

* * * * *